United States Patent
Nishibayashi et al.

(10) Patent No.: US 9,368,970 B2
(45) Date of Patent: Jun. 14, 2016

(54) CHARGE/DISCHARGE INSTRUCTION APPARATUS, CHARGE/DISCHARGE INSTRUCTION METHOD AND CHARGE/DISCHARGE INSTRUCTION PROGRAM

(75) Inventors: Yasuyuki Nishibayashi, Kanagawa (JP); Keiichi Teramoto, Tokyo (JP); Kotaro Ise, Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 363 days.

(21) Appl. No.: 13/526,648

(22) Filed: Jun. 19, 2012

(65) Prior Publication Data

US 2013/0082640 A1     Apr. 4, 2013

(30) Foreign Application Priority Data

Sep. 30, 2011 (JP) ................. 2011-218673

(51) Int. Cl.
*H02J 3/32* (2006.01)
(52) U.S. Cl.
CPC . *H02J 3/32* (2013.01); *Y02T 90/128* (2013.01)
(58) Field of Classification Search
CPC .................................. Y02T 90/128
USPC ....................................... 320/109
See application file for complete search history.

(56) References Cited

U.S. PATENT DOCUMENTS

| | | | |
|---|---|---|---|
| 6,639,383 B2 | 10/2003 | Hoff et al. | |
| 8,278,881 B2* | 10/2012 | Woody et al. | 320/162 |
| 8,509,976 B2* | 8/2013 | Kempton | 701/22 |
| 2009/0091291 A1* | 4/2009 | Woody et al. | 320/109 |
| 2010/0017249 A1* | 1/2010 | Fincham et al. | 705/8 |
| 2010/0262312 A1* | 10/2010 | Kubota et al. | 700/295 |
| 2011/0144823 A1* | 6/2011 | Muller et al. | 700/297 |
| 2011/0202418 A1* | 8/2011 | Kempton et al. | 705/26.1 |

(Continued)

FOREIGN PATENT DOCUMENTS

| | | |
|---|---|---|
| EP | 2048761 A1 * | 4/2009 |
| JP | 2003-284244 | 10/2003 |

(Continued)

OTHER PUBLICATIONS

Office Action of Notification of Reasons for Refusal for Japanese Patent Application No. 2011-218673 Dated Nov. 7, 2014, 6 pages.

(Continued)

*Primary Examiner* — Stacy Whitmore
(74) *Attorney, Agent, or Firm* — Amin, Turocy & Watson LLP; Gregory Turocy

(57) ABSTRACT

One embodiment provides a charge/discharge instruction apparatus, including: a charge/discharge instruction unit which instructs a charge/discharge determination apparatus to perform a charge/discharge control of a battery; a charge/discharge information storage unit which stores charge/discharge information for charging/discharging the battery; a control unit which controls an access request to the battery based on the stored charge/discharge information and contents of the charge/discharge control; a generating unit which generates a communication message concerned with the access request controlled by the control unit; and a communication unit which transmits the communication message concerned with the access request to the charge/discharge determination apparatus.

5 Claims, 24 Drawing Sheets

(56) References Cited

U.S. PATENT DOCUMENTS

| | | | |
|---|---|---|---|
| 2011/0282535 A1* | 11/2011 | Woody et al. | 701/22 |
| 2011/0298422 A1* | 12/2011 | Failing | 320/109 |
| 2012/0049787 A1* | 3/2012 | Kuroiwa | 320/106 |
| 2012/0053742 A1* | 3/2012 | Tsuda | 700/291 |
| 2012/0109402 A1* | 5/2012 | Shelton et al. | 700/297 |
| 2012/0109409 A1* | 5/2012 | Hara | 701/1 |
| 2012/0109797 A1* | 5/2012 | Shelton et al. | 705/34 |
| 2012/0242301 A1* | 9/2012 | Terashima et al. | 323/234 |
| 2012/0249048 A1* | 10/2012 | Nishibayashi et al. | 320/101 |
| 2012/0249068 A1* | 10/2012 | Ishida | 320/109 |
| 2012/0249152 A1* | 10/2012 | Nishibayashi et al. | 324/430 |
| 2012/0286723 A1* | 11/2012 | Ukita et al. | 320/107 |
| 2013/0009607 A1* | 1/2013 | Nishibayashi et al. | 320/162 |
| 2013/0015809 A1* | 1/2013 | Frey et al. | 320/106 |
| 2013/0082641 A1* | 4/2013 | Nishibayashi et al. | 320/106 |
| 2013/0169226 A1* | 7/2013 | Read | 320/109 |
| 2013/0179061 A1* | 7/2013 | Gadh et al. | 701/123 |
| 2013/0211885 A1* | 8/2013 | Carpinteri | 705/14.1 |
| 2013/0300362 A1* | 11/2013 | Turner | 320/109 |
| 2014/0159660 A1* | 6/2014 | Klose et al. | 320/109 |

FOREIGN PATENT DOCUMENTS

| | | |
|---|---|---|
| JP | 2006-094648 | 4/2006 |
| JP | 2006-514527 | 4/2006 |
| JP | 2009-273359 | 11/2009 |
| JP | 2010-268602 | * 11/2010 |
| JP | 2011-155713 | 8/2011 |
| WO | 2004-073136 | 8/2004 |
| WO | 2010-117082 | 10/2010 |
| WO | 2011089854 | 7/2011 |

OTHER PUBLICATIONS

Extended European Search Report mailed Sep. 29, 2014 corresponding to U.S. Appl. No. 13/526,648, filed Jun. 19, 2012.

Office Action of Notification of Reasons for Refusal for Japanese Patent Application No. 2011-218673 Dated Jan. 23, 2015, 7 pages.

* cited by examiner

*FIG. 6A*

| ACCESS CONTROL INFORMATION | |
|---|---|
| REMAINING NUMBER OF CONTROL PERMITS | 0 REMAINING |
| CONTROL-PERMITTED APPARATUS | EMS 1, EMS 2 |

*FIG. 6B*

| BATTERY CHARACTERISTIC INFORMATION | |
|---|---|
| RATED CHARGE/DISCHARGE POWER | P (W) |
| RATED CAPACITY | Q (Wh) |
| STATE OF CHARGE (SOC) | X (%) |
| DISCHARGEABLE TIME | $\alpha$ (h) |
| CHARGEABLE TIME | $\beta$ (h) |

*FIG. 6C*

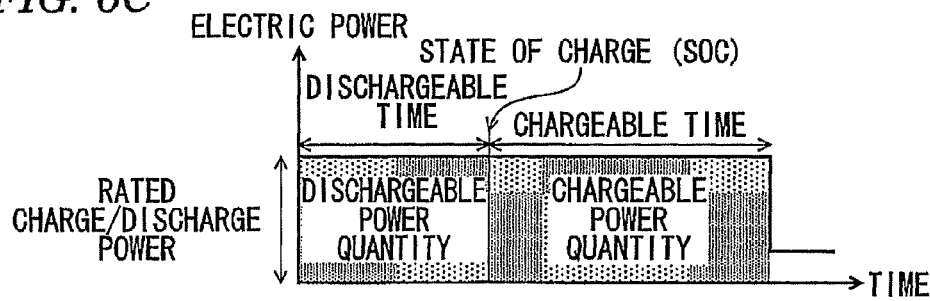

*FIG. 6D*

| CHARGE/DISCHARGE CONTROL INFORMATION | |
|---|---|
| ON-DEMAND OPERATION | INVALID |
| SCHEDULED OPERATION | VALID |

*FIG. 6E*

| AUTHENTICATION INFORMATION | |
|---|---|
| REMAINING NUMBER OF AUTHENTICATION POTENTIALITIES | 98 REMAINING |
| AUTHENTICATED APPARATUS | EMS 1, EMS 2 |

FIG. 7A

| CHARGE/DISCHARGE DETERMINATION INFORMATION | |
|---|---|
| CHARGE REQUEST AT CHARGE TIME | PERMITTED |
| DISCHARGE REQUEST AT CHARGE TIME | FORBIDDEN |
| CHARGE REQUEST AT DISCHARGE TIME | FORBIDDEN |
| DISCHARGE REQUEST AT DISCHARGE TIME | PERMITTED |

FIG. 7B

| EMS MANAGEMENT INFORMATION | |
|---|---|
| EMS IDENTIFIER | EMS 1 IP ADDRESS<br>EMS 2 IP ADDRESS |

FIG. 8A

| CHARGE/DISCHARGE POWER INFORMATION ||
|---|---|
| RATED DISCHARGE POWER | P (W) |
| RATED CHARGE POWER | P (W) |
| DISCHARGEABLE TIME | $\alpha$ (h) ※ UPDATE AT ANY TIME IN ACCORDANCE WITH EXECUTION OF CHARGE/DISCHARGE |
| CHARGEABLE TIME | $\beta$ (h) ※ UPDATE AT ANY TIME IN ACCORDANCE WITH EXECUTION OF CHARGE/DISCHARGE |
| PERMITTED POWER QUANTITY | EMS 1: DISCHARGE TIME to1, DISCHARGE POWER po1<br>EMS 2: DISCHARGE TIME to1, DISCHARGE POWER po2<br>EMS 1: CHARGE TIME ti1, CHARGE POWER pi1 |

FIG. 8B

- DISCHARGE TIME to1 $\leqq$ DISCHARGEABLE TIME $\alpha$
- DISCHARGE POWER po1+po2 $\leqq$ RATED DISCHARGE POWER P
- CHARGE TIME ti1 $\leqq$ CHARGEABLE TIME $\beta$
- CHARGE POWER pi1 $\leqq$ RATED CHARGE POWER P

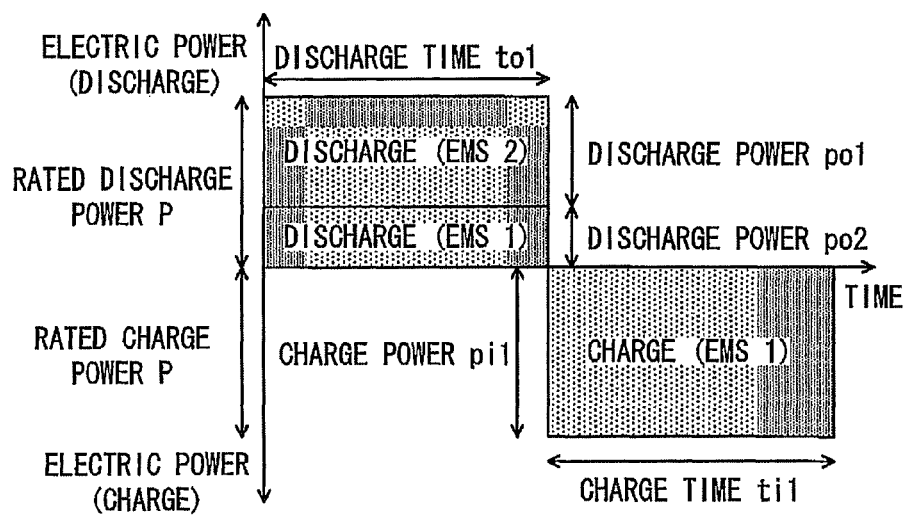

FIG. 10A

| ACCESS CONTROL INFORMATION | |
|---|---|
| CONTROL-PERMITTED BATTERY | BATTERY SYSTEM 1 |

FIG. 10B

| BATTERY CHARACTERISTIC INFORMATION | |
|---|---|
| TARGET BATTERY | BATTERY SYSTEM 1 |
| RATED CHARGE/DISCHARGE POWER | P (W) |
| STATE OF CHARGE (SOC) | X (%) |
| DISCHARGEABLE TIME | $\alpha$ (h) |
| CHARGEABLE TIME | $\beta$ (h) |

FIG. 10C

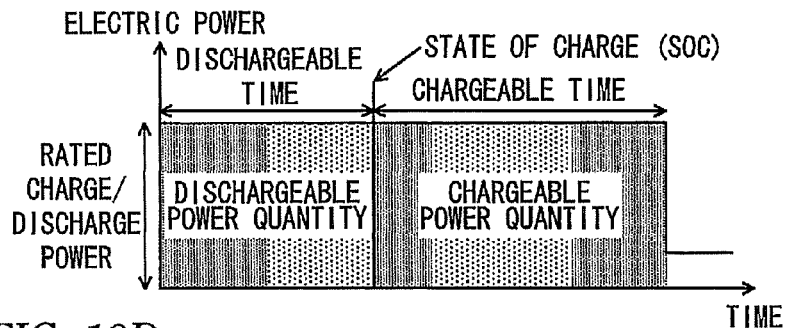

FIG. 10D

| CHARGE/DISCHARGE CONTROL INFORMATION | |
|---|---|
| TARGET BATTERY | BATTERY SYSTEM 1 |
| ON-DEMAND OPERATION | INVALID |
| SCHEDULED OPERATION | VALID |

FIG. 10E

| AUTHENTICATION INFORMATION | |
|---|---|
| AUTHENTICATED BATTERY | BATTERY SYSTEM 1<br>BATTERY SYSTEM 2 |

FIG. 11A

| CHARGE/DISCHARGE POWER INFORMATION ||
|---|---|
| TARGET BATTERY | BATTERY SYSTEM 1 |
| RATED DISCHARGE POWER | P (W) |
| RATED CHARGE POWER | P (W) |
| DISCHARGEABLE TIME | $\alpha$ (h) ※ UPDATE AT ANY TIME IN ACCORDANCE WITH EXECUTION OF CHARGE/DISCHARGE |
| CHARGEABLE TIME | $\beta$ (h) ※ UPDATE AT ANY TIME IN ACCORDANCE WITH EXECUTION OF CHARGE/DISCHARGE |
| SCHEDULED POWER QUANTITY | FIRST CYCLE: DISCHARGE TIME to1, DISCHARGE POWER po1<br>SECOND CYCLE: DISCHARGE TIME to2, DISCHARGE POWER po2 |

FIG. 11B

- DISCHARGE TIME to1 $\leq$ DISCHARGEABLE TIME $\alpha$
- DISCHARGE POWER po1 $\leq$ RATED DISCHARGE POWER P
- DISCHARGE TIME to2 $\leq$ DISCHARGEABLE TIME $\alpha'$
- DISCHARGE POWER po2 $\leq$ RATED CHARGE POWER P

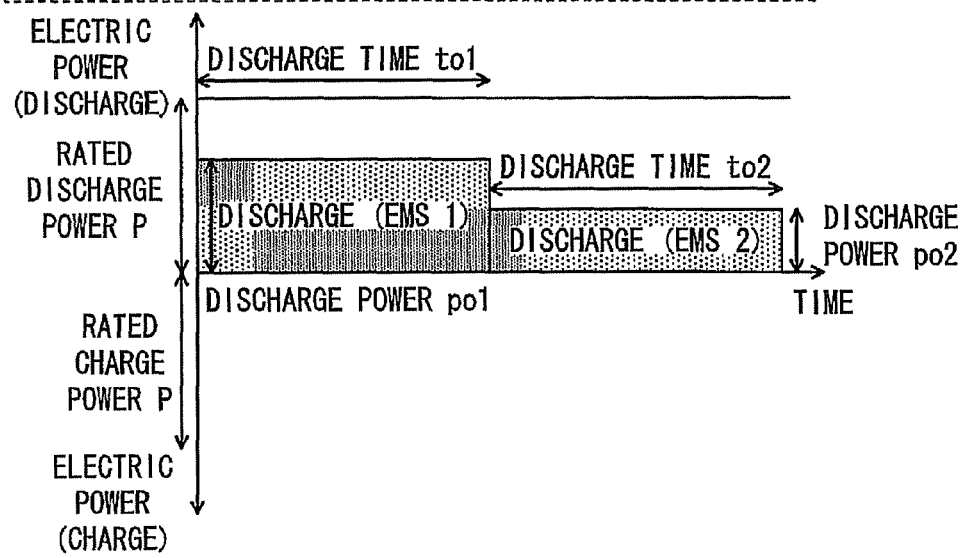

FIG. 11C

| BATTERY MANAGEMENT INFORMATION ||
|---|---|
| BATTERY IDENTIFIER | BATTERY SYSTEM 1  IP ADDRESS<br>BATTERY SYSTEM 2  IP ADDRESS |

*FIG. 24A*

| TCP/IP HEADER | IDENTIFIER (AUTHENTICATION) | AUTHENTICATION INFORMATION |
|---|---|---|

*FIG. 24B*

| TCP/IP HEADER | IDENTIFIER (REQUEST) | NUMBER | START TIME | END TIME | CHARGE/ DISCHARGE POWER |
|---|---|---|---|---|---|

*FIG. 24C*

| TCP/IP HEADER | IDENTIFIER (PERMISSION) | NUMBER | PERMIT/ FORBID | START TIME | END TIME | CHARGE/ DISCHARGE POWER |
|---|---|---|---|---|---|---|

*FIG. 24D*

| TCP/IP HEADER | IDENTIFIER (TERMINATION) |
|---|---|

*FIG. 24E*

| TCP/IP HEADER | IDENTIFIER (CONTROL) | NUMBER | START TIME | END TIME | CHARGE/ DISCHARGE POWER |
|---|---|---|---|---|---|

CHARGE/DISCHARGE INSTRUCTION APPARATUS, CHARGE/DISCHARGE INSTRUCTION METHOD AND CHARGE/DISCHARGE INSTRUCTION PROGRAM

CROSS-REFERENCE TO RELATED APPLICATION(S)

This application claims priority from Japanese Patent Application No. 2011-218673 filed on Sep. 30, 2011, the entire contents of which are incorporated herein by reference.

FIELD

Embodiments described herein relate generally to a charge/discharge instruction apparatus, a charge/discharge instruction method and a charge/discharge instruction program.

BACKGROUND

There are a method in which a control subject connected to storage batteries with many-to-one relationship controls charge/discharge of the storage batteries collectively, and a method in which a control subject connected to a battery with one-to-one relationship controls a charge/discharge schedule of the battery.

When renewable energy large in output change is incorporated in an electric power system, it is useful that a battery system (energy storage) is utilized as a buffer because there is a possibility of a power failure accident if electric power is not transmitted stably. Battery systems are provided on a utility side which is a management region of a power producer and provided on a consumer side which is a management region of a home, a building, etc. in accordance with the scales so as to be utilized for the respective purposes. For example, as the purpose of use on the utility side of the power producer, a battery system is generally utilized for achieving a function called ancillary service by which the system is stabilized by adjusting the output at intervals of tens of seconds in accordance with instantaneous load change in order to keep the quality of electricity such as the frequency or voltage of the system. On the other hand, as the purpose of use on the consumer side such as a home, a building, etc., a battery system is utilized for achieving a function called peak shift by which low unit-cost nighttime electric power is stored to be flexibly used in a time zone of daytime having concentration of use of electric power. As to the relationship of control subject to battery system, there is assumed configuration of many-to-many relationship in which power producers perform charge/discharge control of battery systems provided on the consumer side under the condition that a predetermined incentive is given to the consumer side, in addition to configuration of one-to-one relationship in which operational limitation is provided by a power producer when the control subject is provided on the utility side or by a home or building administrator when the control subject is provided on the consumer side. For this reason, when there are plural control subjects for a battery system, rival for charge/discharge control occurs.

Because rival for charge/discharge control occurs when there are plural control subjects for a battery system, it is impossible to charge the battery beyond its capacity when, for example, contents of a new charge control instruction is applied in a situation that the battery system is executing charge control. On the other hand, when one single control subject is permitted to make charge/discharge control of the battery system for a divided period on a time axis, power throughput is lowered because the quantity of input/output per unit time of the battery cannot be utilized to the utmost. For this reason, according to the background art, it is difficult to increase the quantity of input/output power (power throughput) per unit time of each battery in a system in which battery systems and control subjects are connected to one another.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

FIGS. 6A to 6E are views of configuration of a battery information storage unit in the charge/discharge determination apparatus in the embodiment.

FIGS. 7A and 7B are views of configuration of a charge/discharge information storage unit in the charge/discharge determination apparatus in the embodiment.

FIGS. 8A and 8B are views of configuration of the charge/discharge information storage unit in the charge/discharge determination apparatus in the embodiment.

FIGS. 10A to 10E are views of configuration of a battery information storage unit in the charge/discharge instruction apparatus in the embodiment.

FIGS. 11A to 11C are views of configuration of a charge/discharge information storage unit in the charge/discharge instruction apparatus in the embodiment.

FIGS. 24A to 24E are views of configuration of communication messages in the embodiment.

DETAILED DESCRIPTION

One embodiment provides a charge/discharge instruction apparatus, including: a charge/discharge instruction unit which instructs a charge/discharge determination apparatus to perform a charge/discharge control of a battery; a charge/discharge information storage unit which stores charge/discharge information for charging/discharging the battery; a control unit which controls an access request to the battery based on the stored charge/discharge information and contents of the charge/discharge control; a generating unit which generates a communication message concerned with the access request controlled by the control unit; and a communication unit which transmits the communication message concerned with the access request to the charge/discharge determination apparatus.

Figure 1:
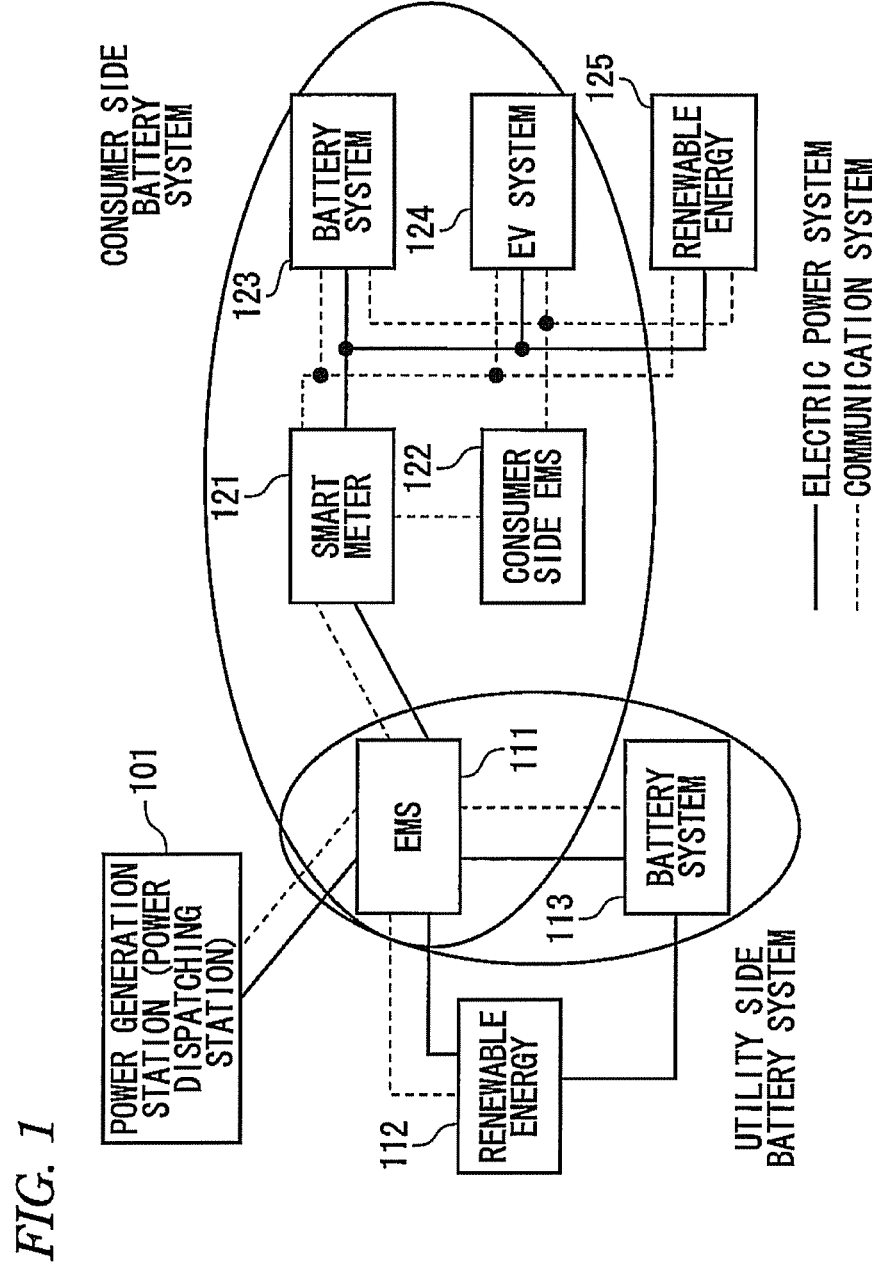
FIG. 1 is a diagram of overall configuration of a system in an embodiment.

FIG. 1 shows a system configuration in an embodiment. In FIG. 1, a power generation station (power dispatching station) 101, an EMS (Energy Management System) 111, a renewable energy 112 and a battery system (energy storage) 113 are provided on a power system grid side. On the other hand, a smart meter 121, a consumer side EMS 122, a battery system (energy storage) 123, an EV (Electric Vehicle) system 124 and a renewable energy 125 are provided on a consumer side such as a home, a building, etc. The consumer side EMS 122 for home use is called HEMS (Home Energy Management System).

The power generation station (power dispatching station) 101 generates large-capacity electric power by motive power such as thermal power, atomic power, etc. and feeds the electric power to the consumer side such as a home, a building, a factory, etc. through a power transmission/distribution grid. In this embodiment, the power transmission/distribution grid from the power generation station to each consumer is generically called electric power system. The renewable energy 112 generates electric power based on energy existing in the world of nature such as wind force or sunlight and feeds the electric power to the consumer side through the power transmission/distribution grid in the same manner as the power generation station. The provision of the renewable energy 112 in the power system grid makes it possible to reduce the load imposed on the power generation station and operate the power generation station efficiently. The battery system 113 plays a role of storing surplus electric power generated by the power generation station and the renewable energy. The EMS 111 plays a role of controlling stabilization of the whole system including supply power fed thus from the power generation station 101 and the renewable energy 112 and load power consumed on the consumer side by utilizing both electric power system and communication system.

The smart meter 121 measures the quantity of electric power consumed on the consumer side premises and notifies a management server of a power producer of the quantity of electric power periodically. The management server is generally called MDMS (Metering Data Management System) but not shown in FIG. 1. The aforementioned EMS 111 can work with the MDMS to calculate the total quantity of load power on the consumer side. The battery system 123 provided on the consumer side premises stores electric power fed from the system grid of the power producer or electric power generated by the renewable energy 125 provided on the consumer side premises. The EV system 124 stores electric power in an on-vehicle battery through a charger. The consumer side EMS 122 (HEMS) adjusts and controls the quantity of power consumption in home. Although the example of FIG. 1 shows the case where the consumer is an ordinary home, the embodiment can be applied not only to the home but also to a building or a factory as described above. In this case, a BEMS (Building Energy Management System) in a building or an FEMS (Factory Energy Management System) in a factory plays a role of adjusting and controlling the quantity of power consumed on the premises in place of the HEMS for home use.

Generally, as the purpose of use on the utility side of the power producer, a battery system is utilized for achieving a function called ancillary service which stabilizes the system by adjusting the output at intervals of tens of seconds in accordance with instantaneous load change in order to maintain the quality of electricity such as the frequency or voltage of the system. On the other hand, as the purpose of use on the consumer side such as a home, a building, etc., a battery system is utilized for achieving a function called peak shift by which low unit-cost nighttime electric power is stored to be flexibly used in a time zone of daytime having concentration of use of electric power. As to the relationship of control subject to battery system, there is assumed configuration of many-to-many relationship in which power producers perform charge/discharge control of battery systems provided on the consumer side under the condition that a predetermined incentive is given to the consumer side, in addition to configuration of one-to-one relationship in which operational limitation is provided by a power producer when the control subject is provided on the utility side or by a home or building administrator when the control subject is provided on the consumer side.

Figure 2A:
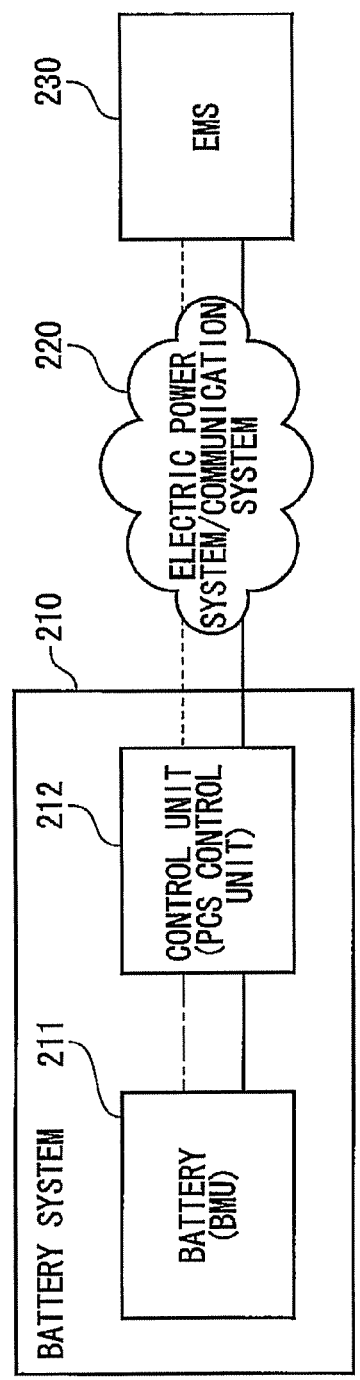
FIGS. 2A and 2B are diagrams of configuration of a battery system and an EV system in the embodiment.
Figure 2B:
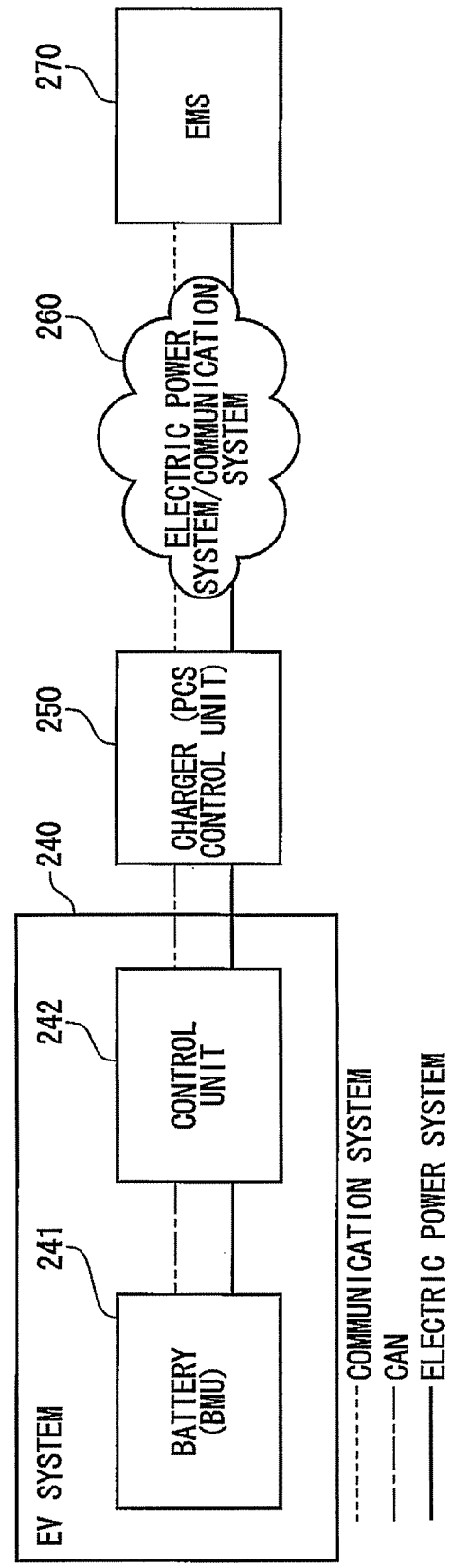

FIG. 2A shows configuration of a battery system (energy storage) 210. FIG. 2B shows configuration of an EV system (energy storage) 240. Although description will be made mainly on the assumption that the battery system 210 is of a stationary type while the EV system 240 is of an on-vehicle type, the embodiment is not limited thereto.

The battery system 210 in FIG. 2A includes a battery (BMU: Battery Management Unit) 211, and a control unit (power conditioning system control unit; PCS control unit) 212. The battery (BMU) 211 has, in addition to plural battery cells, an internal processor which manages the internal state of a battery pack and which executes charge/discharge control of electric power based on an instruction given from the control unit (PCS control unit) 212. The battery (BMU) 211 notifies the control unit (PCS control unit) 212 of information such as the rated voltage of the battery, the maximum current value at charge/discharge time, the state of charge (SOC) and the state of health (SOH). Although the control unit (PCS control unit) 212 performs DC/AC conversion and voltage change suppression, the function of the control unit (PCS control unit) 212 per se may be achieved on an external processor connected to the PCS. In addition to a method in which charge/discharge control and information notification between the battery (BMU) 211 and the control unit (PCS control unit) 212 are implemented by means of a CAN (Controller Area Network), the two may be implemented by means of a communication medium such as an LAN and further by means of an electric signal line defined uniquely by a vendor. The embodiment is not limited to any one of these methods.

The control unit (PCS control unit) 212 in the battery system 210 shown in FIG. 2A has a communication function which communicates with an EMS 230 provided on the utility side, through an electric power system/communication system 220 to control charge/discharge of the battery (BMU). Because the battery is generally characterized by discharging electricity naturally, there is a problem that the EMS 230 hardly grasps the correct state of the battery system 210 when the background art is simply applied to the battery system 210. Therefore, in the embodiment, the EMS collects information such as SOC, SOH, etc. from the battery system through the communication system so that the EMS can give an instruction of charge/discharge control while properly monitoring the ever-changing state. Incidentally, in the embodiment, the input/output of electric power into/from the battery in the battery system is written "charge/discharge control of the battery" for short.

The EV system 240 shown in FIG. 2B is similar in configuration to the battery system 210 shown in FIG. 2A but different from the battery system 210 in that a charger (PCS control unit) 250 is provided separately. A control unit 242 in the EV system 240 shown in FIG. 2B relays charge/discharge control and information notification between the battery (BMU) 241 and the charger (PCS control unit) 250 but has no communication function for communicating with an EMS 270 on the power system grid. That is, in the configuration of the EV system 240 in FIG. 2B, the main function of the control unit 212 in the battery system 210 in FIG. 2A is shifted to the charger 250. However, the control unit 242 of the EV system 240 may be formed to have the same function as the control unit 212 of the battery system 210 as well as the specific procedure for achieving the embodiment is common to FIGS. 2A and 2B. With respect to algorithm processes concerned with charge/discharge of the battery (BMU) 241, there are plural modes such as a mode in which the algorithm processes are aggregated in the control unit 242, a mode in which the algorithm processes are aggregated in the charger 250, a mode in which the algorithm processes are aggregated in the HEMS on the premises or in the EMS 270 in the power system grid, etc. It is a matter of course that the embodiment can be achieved by use of the same scheme even when any mode is used.

Figure 3A:
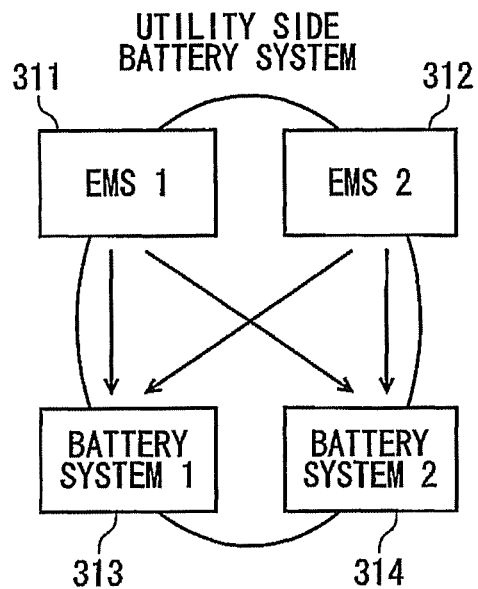
FIGS. 3A and 3B are diagrams of configuration of control by EMSs in the embodiment.
Figure 3B:
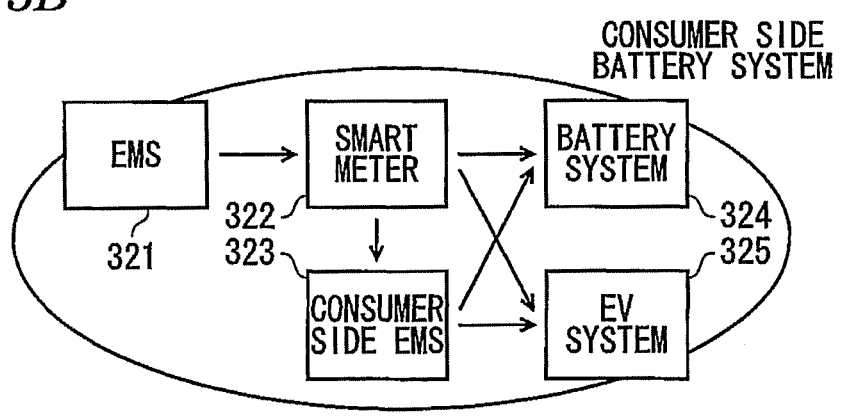

An example of the use case assumed by the embodiment will be described with reference to FIGS. 3A and 3B. FIG. 3A shows a configuration example in a utility side battery system (energy storage). As described above, the battery system generally has a function called ancillary service to cope with instantaneous load change on the power system grid side. In this case, it is desirable that battery systems (energy storages) 1 (313) and 2 (314) are connected to each other in use as shown in FIG. 3A because it is necessary to keep a large-scale storage capacity equal to that of a power generation station. Although one EMS is enough as a subject of control of storage batteries when electric power is closed in a certain region, it is desirable that an EMS 1 (311) and an EMS 2 (312) are prepared when electric power is used flexibly with stored electric power over plural regions. Accordingly, when a large-scale system is to be constructed for power utility side storage batteries, there is assumed a mode in which plural battery systems (313 and 314) and plural EMSs (311 and 312) are connected to one another to form a system as shown in FIG. 3A. In this case, a rival state may occur in charge/discharge control due to the presence of plural control subjects of the battery systems (313 and 314), it is difficult to increase power throughput. On the other hand, FIG. 3B shows a configuration example in a consumer side battery system (energy storage). As described above, on the consumer side, a battery system generally has a function called peak shift by which low unit-cost nighttime electric power is stored to be flexibly used in a time zone of daytime having concentration of use of electric power. In addition, it is assumed that a power producer performs charge/discharge control of a battery system provided on the consumer side under the condition that a predetermined incentive is given to the consumer side. Accordingly, when both a utility side EMS 321 and a consumer side EMS 323 gain access to the consumer side battery system to use electric power in common as shown in FIG. 3B, there is assumed a mode in which a battery system (energy storage) 324, an EV system 325 and the EMSs 321 and 323 are connected to one another to form a system. In this case, a rival state may occur in charge/discharge control due to the presence of plural subjects of control of battery systems, similarly to the example shown in FIG. 3A, it is difficult to increase electric power throughput.

Figure 4:
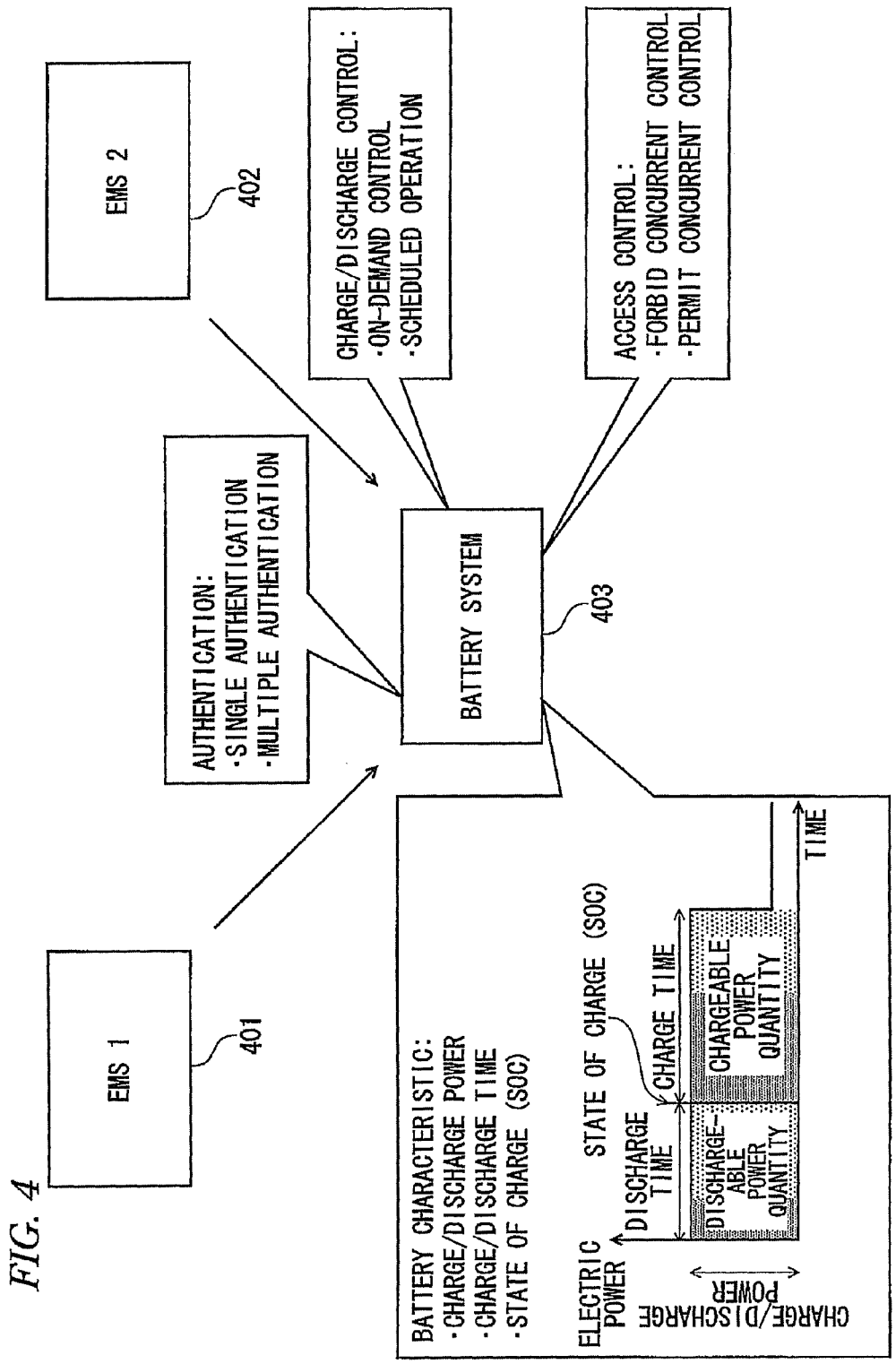
FIG. 4 is a unique characteristic diagram of access control to the battery system in the embodiment.

Configuration in the case where an EMS 1 (401) and an EMS 2 (402) as control subjects instruct a battery system (energy storage) 403 to perform charge/discharge control will be described with reference to FIG. 4. Rival for access control to shared resources on a DB (Data Base) server in a general IT (Information Technology) system is solved by using the concept of semaphore. There are however some problems when this concept is simply applied to charge/discharge control of a battery system. As shown in FIG. 4, characteristic information peculiar to a battery includes rated charge/discharge power indicating a permitted input/output quantity per unit time, a present state of charge (SOC), discharge time and charge time corresponding to the SOC, etc. When, for example, the concept of semaphore for exclusive control is used here to separate control into control of the EMS 1 (401) in one time zone and control of the EMS 2 (402) in another time zone in consideration of the situation that the rated charge/discharge power of the battery in FIG. 4 is 100 W, the EMS 1 (401) requests discharge of power of 60 W and the EMS 2 (402) requests discharge of power of 30 W, efficiency is poor because the quantity of electric power per unit time is up to 60 W. In the first example, it is desirable that discharge control of the EMS 1 (401) and discharge control of the EMS 2 (402) are permitted simultaneously. When charge controls are simultaneously permitted in consideration of the situation that the rated charge/discharge power of the battery in FIG. 4 is 100 W, the EMS 1 (401) requests charge of power of 60 W and the EMS 2 (402) requests charge of power of 50 W as another example, the battery cannot be charged with electricity exceeding the allowable quantity of the battery because excess of the allowable input quantity of the battery brings about an overcharge state to cause an accident such as a fire, an explosion, etc. In the second example, it is desirable that charge control of the EMS 1 (401) and charge control of the EMS 2 (402) are not permitted simultaneously. Although access control of the DB server requires selection as to whether a file is edited or not, control of the battery system requires consideration of the quantity of inflow power. Accordingly, as shown in FIG. 4, it is necessary from the viewpoint of achievement of both safety and power throughput that access control (forbidding of concurrent control/permission of concurrent control) is determined based on characteristic of the battery to execute charge/discharge control (on-demand operation with instructions issued sequentially/scheduled operation with instructions issued intentionally based on future schedule information). Moreover, when authentication (authentication of one single apparatus/authentication of plural apparatuses) for securing safety of a communication path is added, it is possible to achieve concealment or tamperproofness of communication messages concerned with charge/discharge control instructions transmitted on a network.

Figure 5:
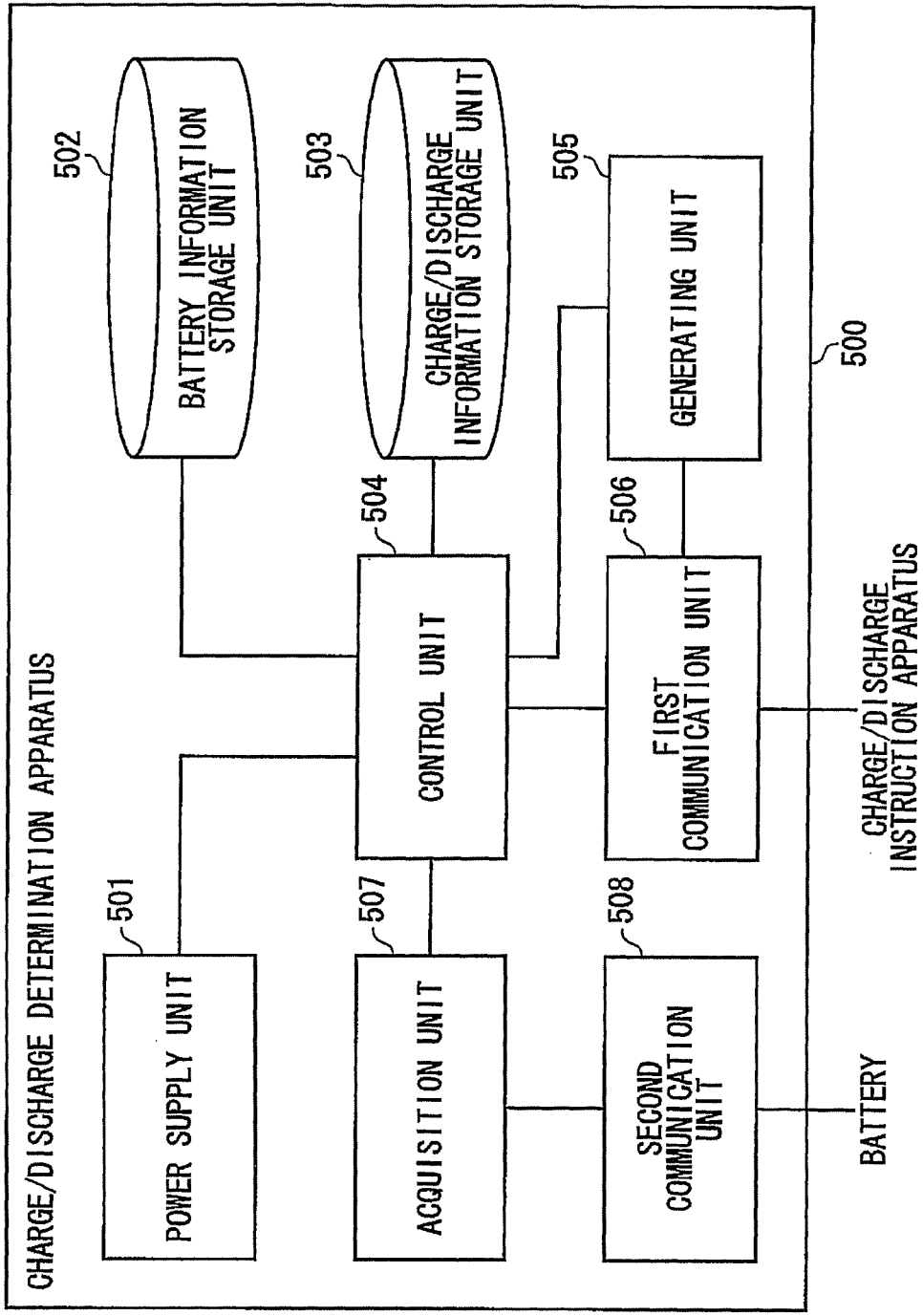
FIG. 5 is a diagram of configuration of a charge/discharge determination apparatus in the embodiment.
Figure 9:
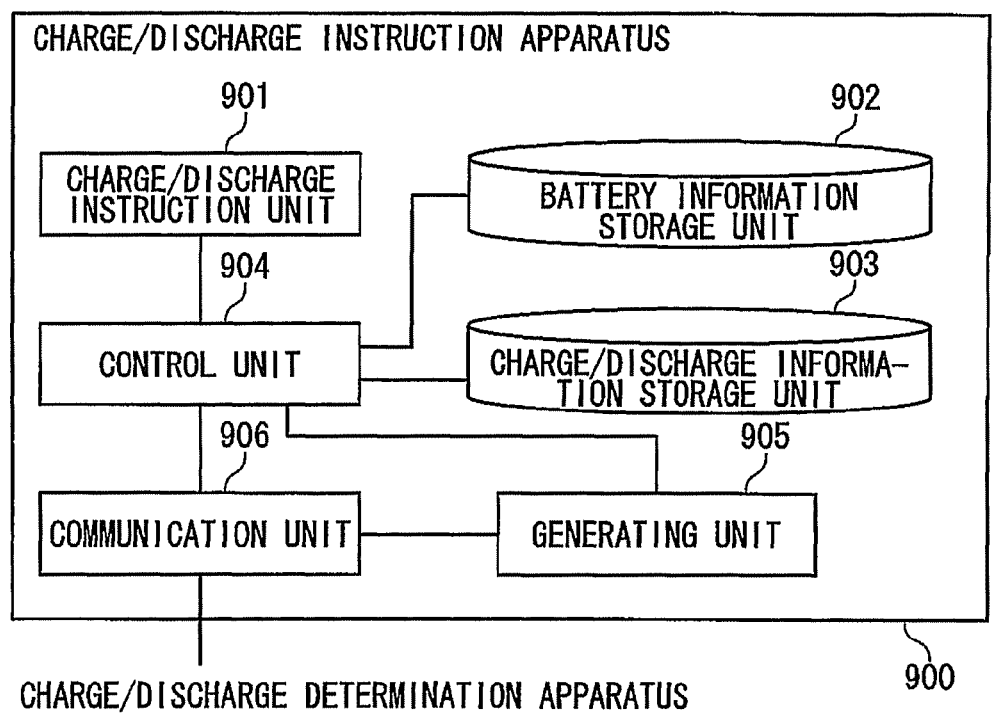
FIG. 9 is a diagram of configuration of a charge/discharge instruction apparatus in the embodiment.

FIG. 5 shows a diagram showing the configuration of a charge/discharge determination apparatus 500 in the embodiment. FIG. 9 is a diagram showing the configuration of a charge/discharge instruction apparatus. The charge/discharge determination apparatus 500 is equivalent to the control unit (PCS control unit) 212 in the battery system 210 in FIG. 2A or the charger (PCS unit) 250 in the EV system 240 in FIG. 2B. The charge/discharge instruction apparatus 900 is equivalent to the EMS provided in the power system grid or on the consumer side premises (ex. the consumer side EMS in the case of the consumer side premises). In the embodiment, the charge/discharge determination apparatus 500 notifies the charge/discharge instruction apparatus 900 of information about the battery (particularly, the battery unit having the BMU mounted therein) and determines whether access concerned with charge/discharge control from the charge/discharge instruction apparatus 900 is permitted or not, so that both safety and maintaining power throughput are achieved in a system in which battery systems and EMSs are connected to one another.

The charge/discharge determination apparatus 500 in FIG. 5 includes a power supply unit 501, a battery information storage unit 502, a charge/discharge information storage unit 503, a control unit 504, a generating unit 505, a first communication unit 506, an acquisition unit 507, and a second communication unit 508. The power supply unit 501 performs AC/DC conversion, power frequency monitoring voltage change detection and suppression, etc. to execute charge/discharge control of the battery unit (BMU) based on an instruction given from the charge/discharge instruction apparatus. In the embodiment, besides the quantity of electric power expressed in Watt hour (Wh), each of the quantity of a current expressed in Ampere hour (Ah) and the quantity of a voltage expressed in Volt hour (Vh) can be used as the quantity of electric power at the time of charge/discharge control. Generally, the quantity of electric power can be calculated as the product of the quantity of a current and the quantity of a voltage. The battery information storage unit 502 stores access control information, battery characteristic information, charge/discharge control information and authentication information as necessary information (battery information) at the time of charge/discharge control of the battery unit (BMU) in the embodiment. FIG. 6A shows a configuration example of the access control information. FIG. 6B shows a configuration example of the battery characteristic information. FIG. 6D shows a configuration example of the charge/discharge control information. FIG. 6E shows a configuration example of the authentication information. The access control information is used for identifying whether charge/discharge control instructions from plural charge/discharge instruction apparatuses can be accepted simultaneously or not. In FIG. 6A, the remaining number of control permits and information of control-permitted apparatuses are written. For example, when simultaneous control up to two charge/discharge instruction apparatuses is to be permitted, the initial value of the remaining number of control permits is 2. When the control unit 504 then determines permission of access control of EMS 1 and EMS 2, the remaining number of control permits becomes zero to forbid any control from the third charge/discharge instruction apparatus et seq. When simultaneous control from plural charge/discharge instruction apparatuses is forbidden on operation of the battery system, the initial value of the remaining number of control permits is 1. This is the same as the concept of access control semaphore for shared resources on a DB server in a general IT system. The battery characteristic information is information peculiar to an individual battery unit (BMU) required for charge/discharge control. For example, in the example shown in FIG. 6B, rated charge/discharge power P expressed in Watt (W), rated capacity Q expressed in Watt hour (Wh), SOC (State Of Charge) X expressed in percentage, and dischargeable time α(h) and chargeable time β(h) corresponding to the SOC are written. In a constant-current charge method which is a general battery charge method, the quantity of electric power (the quantity of a current) inputted/outputted by each battery cell in the battery unit (BMU) changes in a constant state until SOC expressed in percentage reaches a predetermined threshold. For this reason, as shown in FIG. 6C, the charge/discharge determination apparatus 500 can calculate chargeable time and dischargeable time (the horizontal axis of the graph) corresponding to the SOC in the battery characteristic information, rated charge/discharge power (the vertical axis of the graph) and the quantity of electric power required for charge/discharge by acquiring the value of SOC from the battery unit (BMU). The constant-current charge is characterized in that the quantity of a current required for charge is locally minimized after the SOC exceeds the predetermined threshold. Incidentally, as described above, besides the quantity of electric power expressed in Watt hour (Wh), each of the quantity of a current expressed in Ampere hour (Ah) and the quantity of a voltage expressed in Volt hour (Vh) can be used as the quantity of electric power at the time of charge/discharge control. The charge/discharge control information is used for identifying the charge/discharge operating state of the battery system. In FIG. 6D, for example, information of on-demand operation and scheduled operation is written. For example, when the battery system is controlled in real time to prevent momentary failure of power supply in the electric power system, it is desirable that on-demand operation is made so that communication messages concerned with charge/discharge control instructions can be received appropriately. On this occasion, as shown in FIG. 6D, the charge/discharge control information is provided so that on-demand operation is valid and scheduled operation is invalid. When the battery system is controlled at intervals of a relatively slow time in nighttime, it is desirable that scheduled operation is made so that an operation timing schedule of charge/discharge control can be set. On this occasion, the charge/discharge control information is provided so that on-demand operation is invalid and scheduled operation is valid. In the embodiment, the charge/discharge determination apparatus 500 performs charge/discharge determination while adding whether simultaneous control of the battery system from plural charge/discharge instruction apparatuses is permitted or not, and whether the battery system makes on-demand operation or scheduled operation. Each specific operation will be described later. FIG. 6E shows the configuration example of the authentication information in the case where an authentication process is used before transmission/reception of a communication message concerned with each charge/discharge control instruction. For example, information of the remaining number of authentication potentialities and authenticated apparatuses is written here. When the number of authentication potentialities is 100 and EMS 1 and EMS 2 have been already authenticated, the authentication information indicates that the remaining number of authentication potentialities is 98 and the authenticated apparatuses are EMS 1 and EMS 2. In the configuration example shown in FIGS. 6A to 6E, it is a matter of course that contents of the configuration can be changed suitably in such a manner that information is extracted in accordance with necessity, a communication protocol type used for authentication is built in, or the like.

In the embodiment, the charge/discharge information storage unit 503 stores charge/discharge determination information, EMS management information and charge/discharge power information as information (charge/discharge information) concerned with charge/discharge control of the battery system. FIG. 7A shows a configuration example of the charge/discharge determination information. FIG. 7B shows a configuration example of the EMS management information. FIG. 8A shows a configuration example of the charge/discharge power information. The charge/discharge determination information is used for identifying whether charge/discharge control from plural charge/discharge instruction apparatuses can be executed simultaneously or not, based on physical constraint of the battery. In the example in FIG. 7A, the charge/discharge determination information is written so that the charge request at charge time and the discharge request at discharge time are permitted but the discharge request at charge time and the charge request at discharge time are forbidden. The EMS management information corresponds to identifiers of charge/discharge instruction apparatuses (EMSs) which are connected to the charge/discharge determination apparatus to make instructions for charge/discharge control. In FIG. 7B, the IP addresses of EMS 1 and EMS 2 which instruct the charge/discharge determination apparatus to execute charge/discharge control are written. Specifically, although it is conceived that IP (Internet Protocol) addresses, URLs (Uniform Resource Locators), etc. are used as shown in the example of FIG. 7B, the EMS management information does not depend on a specific notation method. The charge/discharge power information is used for management of the allowable quantities (present values or scheduled values) of electric power allocated to plural charge/discharge instruction apparatuses. In the example in FIG. 8A, rated discharge power P and rated charge power P expressed in Watt (W), dischargeable time α(h) and chargeable time β(h) updated at any time in accordance with execution of charge/discharge and the allowable quantity of electric power are written. As shown in FIG. 8B, the allowable quantity of electric power indicates a state in which charge/discharge control instructions are accepted simultaneously from EMS 1 and EMS 2 which operate as charge/discharge instruction apparatuses within the physically allowable ranges of power and time. On this occasion, the instructions from EMS 1 and EMS 2 satisfy the condition that discharge time to1 is not longer than dischargeable time α(h), discharge power po1 (EMS 1)+po2(EMS 2) is not higher than P(W), charge time ti1(EMS 1) is not longer than chargeable time β(h), and charge power pi(EMS 1) is not higher than P(W).

When the first communication unit 506 receives a communication message concerned with an access request from a charge/discharge instruction apparatus (EMS), the control unit 504 determines whether the access request from the charge/discharge instruction apparatus (EMS) is permitted or not, based on the contents of the access request, battery information and charge/discharge information. For example, determination as to whether the access request is permitted or not, is made based on the remaining number of control permits in the access control information, and determination as to whether the access request is permitted or not, is made based on whether the charge/discharge control content of the access request satisfies the condition of charge/discharge power information or not. For example, determination as to whether the access request is permitted or not, may be further made based on whether the charge/discharge control content of the access request satisfies charge/discharge determination information or not, and determination as to whether the access request is permitted or not, may be further made based on whether the charge/discharge control content of the access request satisfies charge/discharge control information or not. For example, the communication message concerned with the access request includes charge/discharge power and chargeable/dischargeable time (start time and end time) as contents of a charge/discharge control instruction.

When the access request is permitted, the control unit 504 stores the access control information in the battery information storage unit 502 so that the remaining number of control permits is reduced by 1 and information of the charge/discharge instruction apparatus (EMS) having the permitted access request is added to the information of control-permitted apparatuses. The generating unit 505 generates a communication message concerned with permission or rejection of the access request in accordance with a determination result made by the control unit 504. The first communication unit 506 transmits the communication message concerned with permission or rejection of the access request, generated by the generating unit 505, to the charge/discharge instruction apparatus (EMS).

The generating unit 505 generates a communication message concerned with access control such as access request, access permission or rejection, access termination, etc. from the charge/discharge determination apparatus (battery system). The first communication unit 506 transmits/receives a communication message concerned with access control such as access request, access permission or rejection, charge/discharge control, etc. between the charge/discharge instruction apparatus (EMS) and the battery system.

When the first communication unit 506 receives a communication message concerned with charge/discharge control from the charge/discharge instruction apparatus (EMS) having the permitted access request, the control unit 504 stores the charge/discharge power information in the charge/discharge information storage unit 503 so that the content of charge/discharge control is added to the allowable quantity of electric power, and the control unit 504 controls the power supply unit 501 to execute charge/discharge control. For example, the communication message concerned with charge/discharge control includes charge/discharge power and chargeable/dischargeable time (start time and end time) as contents of the charge/discharge control instruction.

When the charge/discharge control is terminated, the generating unit 505 generates a communication message indicating the completion of the charge/discharge control. The first communication unit 506 transmits the communicated message generated by the generating unit 505 for indicating the completion of the charge/discharge control to the charge/discharge instruction apparatus (EMS). Then, the first communication unit 506 receives a message concerned with access termination from the charge/discharge instruction apparatus (EMS). As a result, a series of charge/discharge control processes with the charge/discharge instruction apparatus (EMS) is terminated.

Incidentally, when one charge/discharge instruction apparatus (EMS) transmitting a communication message concerned with access rejection can start new charge/discharge control because charge/discharge control from another charge/discharge instruction apparatus (EMS) has been terminated, the control unit 504 may determine whether an access request is permitted newly or not. The generating unit 505 may generate a communication message concerned with access permission in accordance with the determination of permission, and the first communication unit 506 may transmit the communication message concerned with access permission to the charge/discharge instruction apparatus (EMS).

Moreover, the generating unit 505 may generate a communication message concerned with power quantity information and access control required for charge/discharge control as acquired from the battery unit (BMU) by the charge/discharge determination apparatus 500, and the first communication unit 506 may transmit the communication message generated by the generating unit 505 to the charge/discharge instruction apparatus on the communication system. The first communication unit 506 can be implemented by means of a wireless communication medium as well as a wire communication medium such as an optical fiber, a telephone line, an LAN, etc. However, the first communication unit 506 in the embodiment does not depend on any specific communication medium. The charge/discharge determination apparatus 500 accepts an instruction concerned with charge/discharge control from the charge/discharge instruction apparatus after determination is made as to whether the access request is permitted or not. When an authentication procedure is applied to a control procedure between the charge/discharge determination apparatus and the charge/discharge instruction apparatus, safety can be further improved.

Although description has been made in the case where communication messages concerned with access control such as access request, access permission, etc. are transmitted/received between the charge/discharge instruction apparatus (EMS) and the charge/discharge determination apparatus 500 so that charge/discharge control is performed after access permission, the charge/discharge determination apparatus 500 may determine whether access control between the charge/discharge instruction apparatus (EMS) and the charge/discharge determination apparatus 500 is permitted or not, based on a trial result (charge/discharge control enable/disable) of charge/discharge control in accordance with a charge/discharge control instruction from the charge/discharge instruction apparatus (EMS) without transmission/reception of the communication message concerned with access control.

The acquisition unit 507 acquires characteristic information (rated capacity, charge/discharge end/start voltage, upper limit temperature, lower limit temperature, maximum charge/discharge current, rated voltage, etc.) as information peculiar to the battery unit (BMU) through the second communication unit 508. The acquisition unit 507 further periodically acquires state information (SOC, SOH, charge/discharge current, charge/discharge voltage) as change information at the time of operation of the battery unit (BMU). Although the second communication emit 508 can be implemented by means of a communication medium such as a CAN or an LAN which is a general interface standard of the battery unit (BMU), and an electric signal line defined uniquely by a vendor dealing with production of the battery system, the second communication unit 508 does not depend on any specific medium. Incidentally, because a battery cell is generally characterized by discharging naturally, it may be not good that a battery system operating as the charge/discharge determination apparatus 500 transmits information such as SOC, SOH, etc. only once to an EMS operating as the charge/discharge instruction apparatus, and it is desirable that the information such as SOC, SOH, etc. is updated in real time in consideration of the situation that values change every moment. In the embodiment, besides the quantity of electric power expressed in Watt hour (Wh), each of the quantity of a current expressed in Ampere hour (Ah) and the quantity of a voltage expressed in Volt hour (Vh) can be used as the quantity of electric power at the time of charge/discharge control. Generally, the quantity of electric power can be calculated by the product of the quantity of a current and the quantity of a voltage.

FIG. 9 shows a charge/discharge instruction apparatus 900 according to the embodiment. The charge/discharge instruction apparatus 900 in FIG. 9 includes a charge/discharge instruction unit 901, a battery information storage unit 902, a charge/discharge information storage unit 903, a control unit 904, a generating unit 905, and a communication unit 906. The battery information storage unit 902, the charge/discharge information storage unit 903 and the control unit 904 in the charge/discharge instruction apparatus 900 have roles paired with the battery information storage unit 502, the charge/discharge information storage unit 503 and the control unit 504 in the charge/discharge determination apparatus 500, respectively. The charge/discharge instruction unit 901 suitably determines and executes a charge/discharge instruction for instructing the battery system to perform discharge control to prevent power failure caused by shortage of power supply or for instructing the battery system to perform charge control to make use of excess power caused by excess of power supply later while monitoring the quantity and frequency state of supplied power in the system grid of the power producer or on the consumer side premises. The charge/discharge instruction unit 901 in the charge/discharge instruction apparatus 900 has an important role as an application to achieve the embodiment as shown in FIG. 1. The battery information storage unit 902 stores access control information, battery characteristic information, charge/discharge control information and authentication information as necessary information (battery information) at the time of charge/discharge control of the battery unit (BMU) in the embodiment. FIG. 10A shows a configuration example of the access control information. FIG. 10B shows a configuration example of the battery characteristic information. FIG. 10D shows a configuration example of the charge/discharge control information. FIG. 10E shows a configuration example of the authentication information. The access control information is used for identifying whether issuing of a charge/discharge control instruction to the charge/discharge determination apparatus (battery system) is permitted or not. In the example shown in FIG. 10A, information of a control-permitted battery (battery system) is written. For example, permission of a result of access control determination in a battery system (energy storage) 1 operating as a charge/discharge determination apparatus is written. When the charge/discharge instruction apparatus 900 controls plural charge/discharge determination apparatuses (battery systems), there are also plural pieces of information for control-permitted storage batteries. The battery characteristic information is information peculiar to each individual battery unit (BMU) necessary for charge/discharge control. For example, in the example shown in FIG. 10B, rated charge/discharge power P(W) expressed in Watt (W), rated capacity Q(Wh) expressed in Watt hour (Wh), SOC (State of Charge) X (%) expressed in percentage and dischargeable time α(h) and chargeable time β(h) associated with the SOC are written. In a constant-current charging method which is a general battery charging method, the quantity of electric power (the quantity of a current) inputted/outputted by each battery cell in the battery unit (BMU) changes in a constant state until the SOC expressed in percentage reaches a predetermined threshold. For this reason, as shown in FIG. 10C, the charge/discharge instruction apparatus 900 can calculate chargeable time and dischargeable time (the horizontal axis of the graph) corresponding to the battery characteristic information, rated charge/discharge power (the vertical axis of the graph) and the quantity of electric power (the product of chargeable/dischargeable time and electric power) required for charge/discharge by acquiring the value of SOC from the battery unit (BMU) of the charge/discharge determination apparatus (battery system). The constant-current charge is characterized in that the quantity of a current required for charge is locally minimized after the SOC exceeds the predetermined threshold. Incidentally, as described above, besides the quantity of electric power expressed in Watt hour (Wh), each of the quantity of a current expressed in Ampere hour (Ah) and the quantity of a voltage expressed in Volt hour (Vh) can be used as the quantity of electric power at the time of charge/discharge control. The charge/discharge control information is used for identifying the charge/discharge operating state of the battery system. In FIG. 10D, for example, information of target battery, on-demand operation and scheduled operation is written. For example, when the battery system is controlled in real time to prevent momentary failure of power supply in the electric power system, it is desirable that on-demand operation is made so that communication messages concerned with charge/discharge control instructions can be transmitted/received appropriately. On the other hand, when the battery system is controlled at intervals of a relatively slow time in a nighttime zone, it is desirable that scheduled operation is made so that an operating timing schedule of charge/discharge control is set. On this occasion, as shown in FIG. 10D, the target battery is a battery system (energy storage) 1 and the charge/discharge control information is provided so that on-demand operation is invalid and scheduled operation is valid. As shown in FIG. 10D, the charge/discharge instruction apparatus 900 in the embodiment acquires information as to whether the charge/discharge determination apparatus (battery system 1) makes on-demand operation or scheduled operation to thereby determine whether scheduled information concerned with charge/discharge is included in the communication message concerned with an access control request which will be described later. Incidentally, respective specific operations with respect to the charge/discharge instruction apparatus 900 will be described later. FIG. 10E shows an example of authentication information in the case where an authentication process is used before transmission/reception of a communication message concerned with each charge/discharge control instruction. For example, information of authenticated storage batteries is written here. When authentication of the battery systems (energy storages) 1 and 2 has been completed, the authentication information indicates that the authenticated storage batteries are the battery systems 1 and 2. In the internal configuration example of the battery information storage unit 902 in the charge/discharge instruction apparatus 900 shown in FIGS. 10A to 10E, it is a matter of course that contents of the configuration can be changed suitably in such a manner that information is extracted in accordance with necessity, a communication protocol type used for authentication is built in, or the like.

In the embodiment, the charge/discharge information storage unit 903 stores charge/discharge power information and battery management information as charge/discharge information concerned with charge/discharge control of the battery system. FIG. 11A shows a configuration example of the charge/discharge power information. FIG. 11C shows a configuration example of the battery management information. The charge/discharge power information is information indicating the quantity of charge/discharge electric power allocated by the charge/discharge determination apparatus. The charge/discharge power information is used for controlling the quantity of allowable required power (present value or scheduled value) from the EMS. In the example shown in FIG. 11A, rated discharge power P(W) and rated charge power P(W) expressed in Watt (W), dischargeable time $\alpha(h)$ and chargeable time $\beta(h)$ updated at any time in accordance with execution of charge/discharge and the quantity of scheduled electric power are written. As shown in FIG. 11B, the quantity of scheduled electric power shows a state in which the charge/discharge instruction apparatus 900 schedules and instructs the quantity of electric power within physically allowable ranges of power and time peculiar to each battery system. As described above, the quantity of electric power is calculated as the product of power and time. The battery management information corresponds to the identifier of each charge/discharge determination apparatus (battery system) to which the charge/discharge instruction apparatus 900 is connected. IP addresses of the battery systems 1 and 2 which are instructed to perform charge/discharge control by the charge/discharge instruction apparatus 900 are written in FIG. 11C. Specifically, it is conceived that IP (Internet Protocol) addresses, URLs (Uniform Resource Locators) or the like are used as in the example of FIG. 11C, the battery management information does not depend on any specific notation method.

The control unit 904 controls an access request to the battery system (charge/discharge determination apparatus) based on the contents of the charge/discharge control instruction from the charge/discharge instruction unit 901 and the charge/discharge power information stored in the charge/discharge information storage unit 903. For example, whether an access request is to be made or not, is determined based on whether the contents of the charge/discharge control instruction satisfy the condition of charge/discharge power information or not. Specifically, the access request is made when charge/discharge power and chargeable/dischargeable time (start time and end time) which are the contents of the charge/discharge control instruction satisfy the condition of rated charge/discharge power, chargeable/dischargeable time and the quantity of scheduled electric power of the battery system in the charge/discharge power information. Otherwise, the access request is not made.

Moreover, the access request to the battery system (charge/discharge determination apparatus) may be controlled based on the contents of the charge/discharge control instruction, the charge/discharge power information and the battery information stored in the battery information storage unit 902. For example, whether the access request is to be made or not, is determined based on whether the content of charge/discharge control satisfies the condition of charge/discharge control information or not. Specifically, determination may be made based on whether the content of charge/discharge control corresponds to control on-demand operation or scheduled operation. When there are plural battery systems in which the contents of the charge/discharge control instruction satisfy the condition of charge/discharge power information, a battery system may be selected based on the battery characteristic information.

The generating unit 905 generates a communication message (inclusive of an instruction message) concerned with access control such as access request, access termination, charge/discharge control, etc. from the charge/discharge instruction apparatus (EMS). The communication unit 906 transmits/receives a communication message concerned with access control such as access request, access permission or rejection, charge/discharge control, etc. between the charge/discharge instruction apparatus (EMS) and the battery system.

When determination is made by the control unit 904 that the access request is to be made, the generating unit 905 generates a communication message concerned with the access request to be transmitted to the battery system. For example, the communication message concerned with the access request includes charge/discharge power and chargeable/dischargeable time (start time and end time) as contents of the charge/discharge control instruction. The communication unit 906 transmits the communication message concerned with the access request generated by the generating unit 905 to the battery system (charge/discharge determination apparatus). The communication unit 906 receives a message concerned with access permission or rejection from the battery system to which the access request is sent by the charge/discharge instruction apparatus 900. When the received communication message is access permission, the control unit 904 stores information of the permitted battery system in access control information of the battery information storage unit 902. The control unit 904 further stores contents of charge/discharge control of the access-permitted battery system in charge/discharge power information of the charge/discharge information storage unit 903. The generating unit 905 generates an instruction message concerned with charge/discharge control of the access-permitted battery system. For example, the instruction communication message includes charge/discharge power and chargeable/dischargeable time (start time and end time) as contents of the charge/discharge control instruction. The communication unit 906 transmits the instruction message concerned with charge/discharge control generated by the generating unit 905 to the access-permitted charge/discharge system. On the other hand, when the received communication message is access rejection, the control unit 904 waits for reception of a communication message concerned with access permission from the access-requested battery system, makes an access request to another battery system satisfying the condition of charge/discharge information or does not perform charge/discharge control of the battery system.

When the communication unit 906 receives a communication message indicating termination of charge/discharge control from the battery system, the control unit 904 determines termination of access to the battery system and deletes information of the access-terminated battery system from the access control information of the charge/discharge information storage unit 903. The generating unit 905 generates a communication message concerned with access termination. The communication unit 906 transmits the communication message concerned with access termination and generated by the generating unit 905 to the access-terminated battery system. Consequently, a series of charge/discharge control processes between the charge/discharge instruction apparatus and the battery system (charge/discharge determination apparatus) is terminated.

Although description has been made in the case where communication messages concerned with access control such as access request, access permission, etc. are transmitted/received between the charge/discharge instruction apparatus 900 and the battery system so that charge/discharge control is performed after access permission, whether access control between the charge/discharge instruction apparatus 900 and the battery system is permitted or not, may be determined based on a result (charge/discharge control enable/disable) of such a trial that the battery system tries to perform charge/discharge control in accordance with the charge/discharge control instruction given to the battery system by the charge/discharge instruction apparatus (EMS) without transmitting/receiving the communication messages concerned with access control.

Moreover, the communication unit 906 may receive a communication message concerned with the battery unit (BMU), etc. required for charge/discharge control from the battery system through a communication system. The communication unit 906 can be implemented by means of a wire communication medium such as an optical fiber, a telephone line, an LAN, etc. or by means of a wireless communication medium. However, the communication unit 906 in the embodiment does not depend on any specific communication medium. When an authentication procedure is used in a control procedure between the charge/discharge determination apparatus 500 and the charge/discharge instruction apparatus 900, safety can be further improved.

First Embodiment

Figure 12:
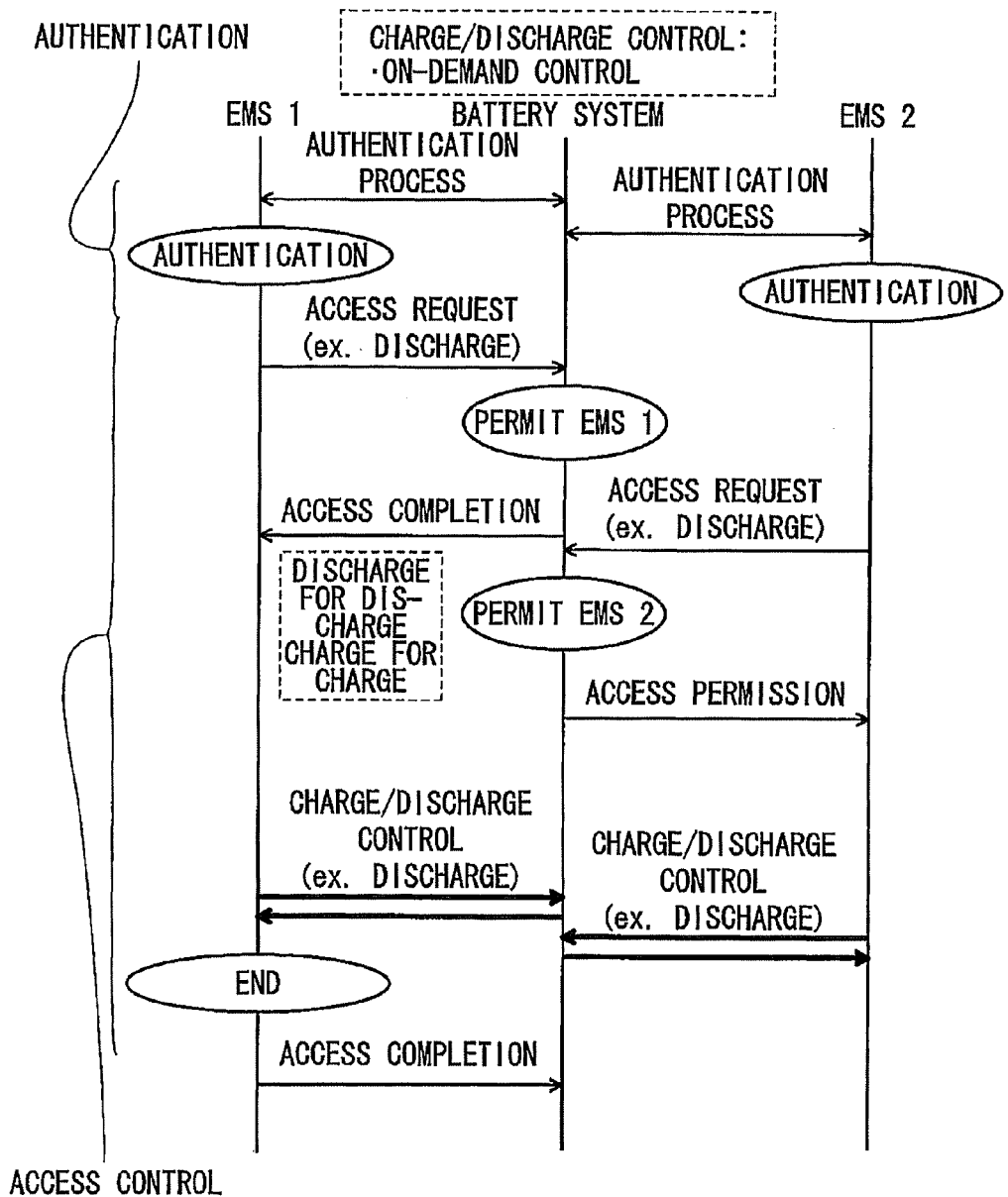
FIG. 12 is a view of an operation sequence in a first embodiment.
Figure 13:
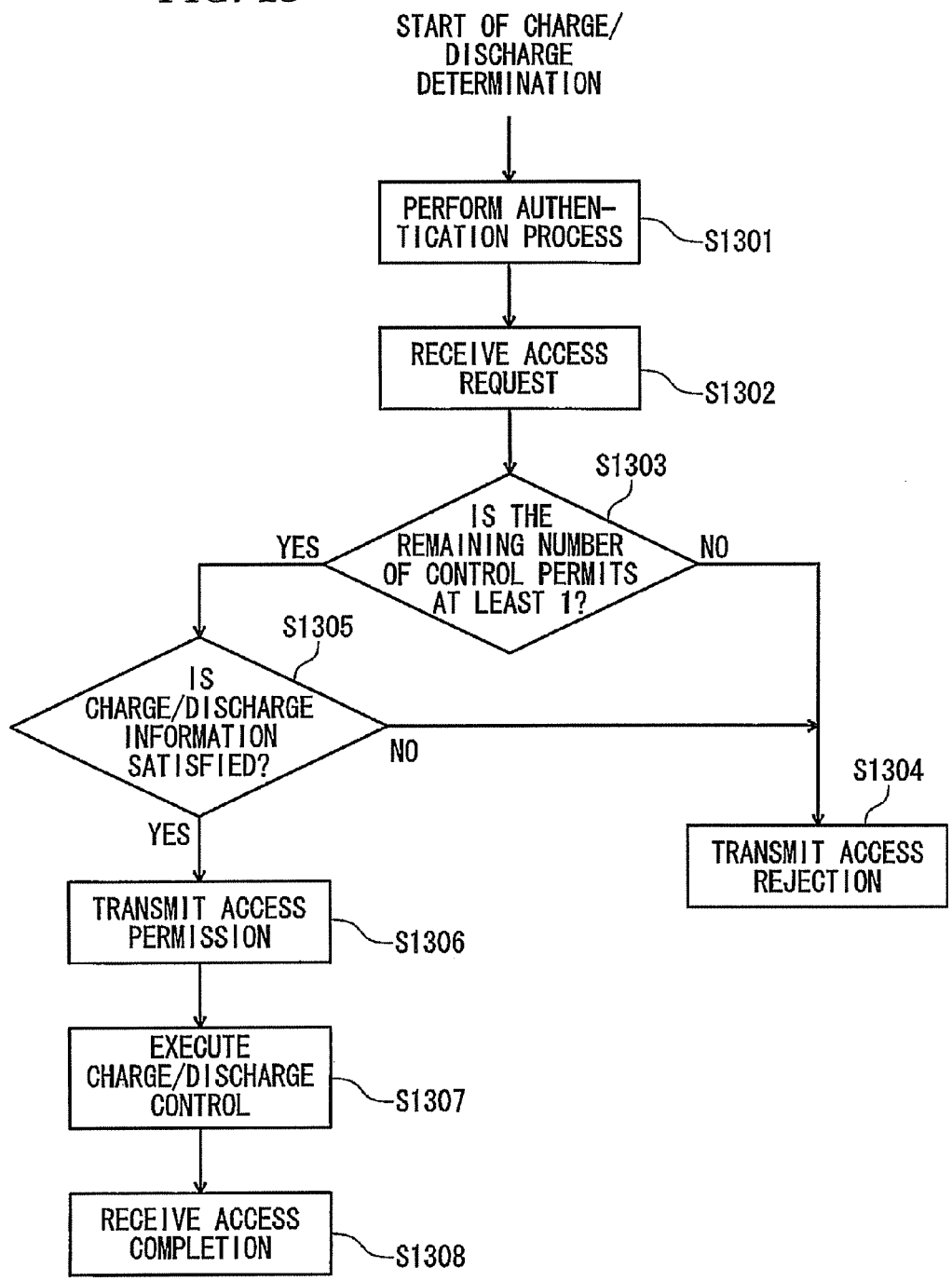
FIG. 13 is a flow chart of operation of the charge/discharge determination apparatus in first and second embodiments.
Figure 14:
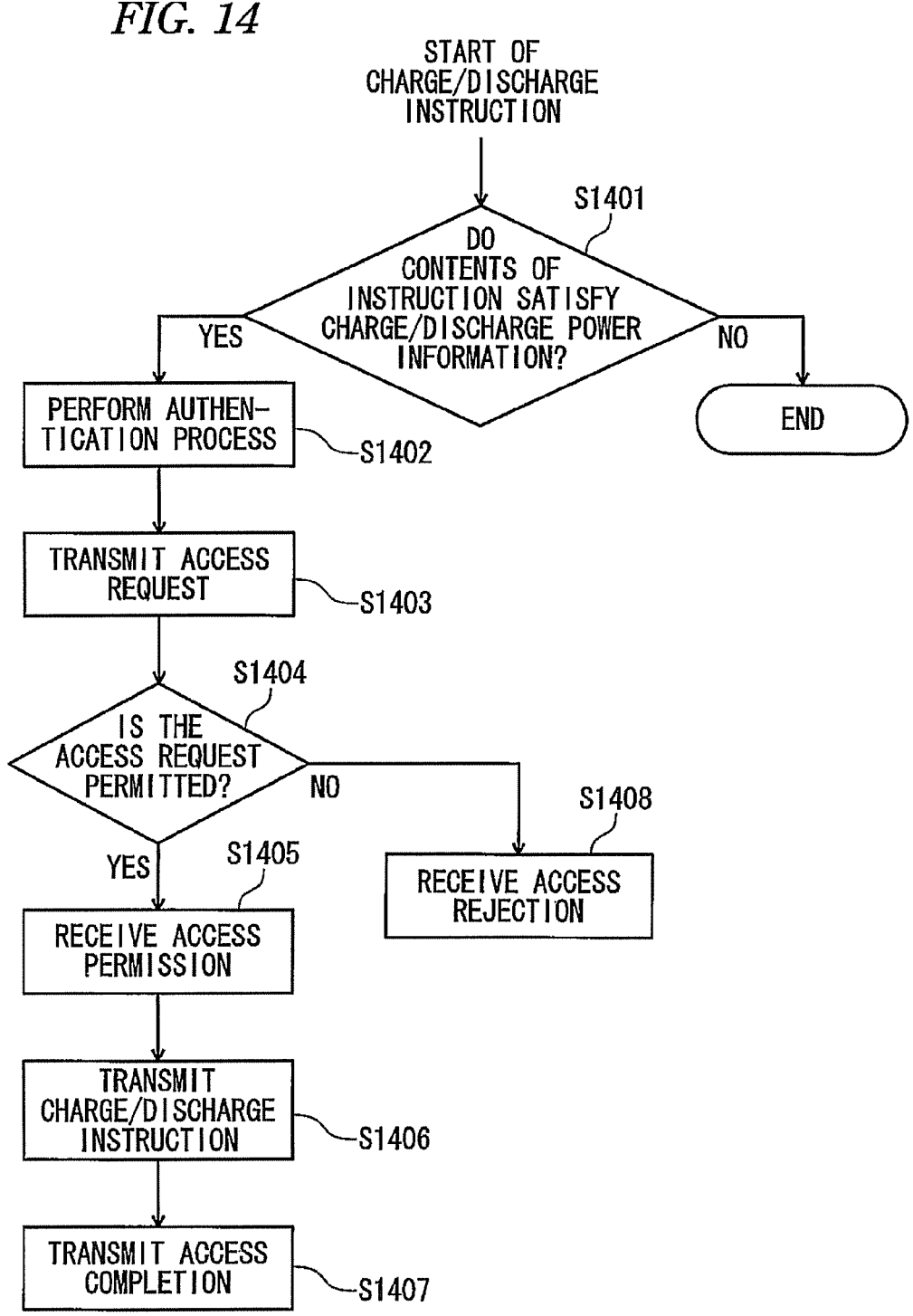
FIG. 14 is a flow chart of operation of the charge/discharge instruction apparatus in first, second and fourth embodiments.

FIG. 12 shows an example of an operation sequence in a first embodiment. FIGS. 13 and 14 show flow charts of operation of a charge/discharge determination apparatus and a charge/discharge instruction apparatus in the first embodiment. Although a scene where one battery system operating as a charge/discharge determination apparatus and two EMSs (EMS 1 and EMS 2) operating as charge/discharge instruction apparatuses are present is assumed in FIG. 12, the number of each type apparatuses does not depend on any specific number. Assume that the battery system in FIG. 12 makes an on-demand operation requiring a charge/discharge control instruction at any time, simultaneous control from plural charge/discharge instruction apparatuses can be permitted, the remaining number of control permits in access control information in FIG. 6A in the charge/discharge determination apparatus is two or more, and the on-demand operation of charge/discharge control information in FIG. 6D is valid.

The control unit 904 determines whether contents of the charge/discharge control instruction from the charge/discharge instruction unit 901 satisfy the condition of charge/discharge power information in the charge/discharge information storage unit 903 or not (S1401). In this embodiment, assume that both EMS 1 and EMS 2 satisfy the condition of charge/discharge power information. When the condition of charge/discharge power information is not satisfied, the authentication process (access request) is not performed.

In FIG. 12, each of EMS 1 and EMS 2 performs an authentication process concerned with initial connection to the battery system (S1301 and S1402). Although it is conceived that a communication authentication process based on RFC (Request For Comment) 5191 provided by IETF (Internet Engineering Task Force) or IEEE 802.1X is applied to the authentication process, this embodiment does not depend on any specific authentication process. When the authentication process is completed, the generating unit 905 of EMS 1 generates a communication message concerned with an access request for discharging the battery, and the communication unit 906 of EMS 1 transmits the generated communication message to the battery system (S1403). The first communication unit 506 of the battery system receives the communication message concerned with the access request (S1302). The control unit 504 of the battery system determines whether the access request is permitted or not, based on information stored in the battery information storage unit 502 and the charge/discharge information storage unit 503 and contents concerned with the access request of EMS 1. In this stage, the battery system has not yet determined whether charge/discharge control of the other EMS 2 is permitted or not. Because the number of control permits in the access control information stored in the battery information storage unit 502 is 2 or more, it can be known that EMS 1 is accessible (S1303). Moreover, because contents of charge/discharge control in the access request satisfy the condition of charge/discharge power information stored in the charge/discharge information storage unit 503, the control unit 504 determines whether the access request from EMS 1 is to be permitted or not (S1305). Although description has been made here in the case where whether the access request is to be permitted or not, is determined based on access control information and charge/discharge power information, determination may be further made based on charge/discharge determination information (whether the discharge request at discharge time/the charge request at charge time is permitted) and charge/discharge control information (whether on-demand operation/scheduled operation is valid or invalid). At this point of time, the control unit 504 reduces the remaining number of control permits in the access control information by one and stores the information in the battery information storage unit 502 so that EMS 1 is allocated as the control-permitted apparatus.

Then, the generating unit 505 of the battery system generates a communication message concerned with access permission, and the first communication unit 506 of the battery system transmits the communication message generated by the generating unit 505 to EMS 1 (S1306). Although information exchange of access request and access permission corresponds to the concept of semaphore control, a method of transmitting/receiving information of the remaining number of control permits corresponding to semaphore on a communication system can be assumed as another method than the method of storing information of the remaining number of control permits corresponding to semaphore in the battery system. Either method may be used. After the communication unit 906 of EMS 1 receives the communication message concerned with access permission (S1405), assume that the generating unit 905 of EMS 2 generates a communication message concerned with an access request for charge/discharge control and the communication unit 906 of EMS 2 transmits the communication message concerned with the access request generated by the generating unit 905 to the battery system (S1403). The control unit 504 of the battery system determines whether the access request for charge/discharge is to be permitted or not, based on information stored in the battery information storage unit 502 and the charge/discharge information storage unit 503 and contents concerned with the access request of EMS 2. In this stage, the battery system has already permitted charge/discharge for EMS 1. Accordingly, in the example of FIG. 12, it can be known that EMS 2 is accessible, from access control information indicating that the remaining number of control permits is one or more (S1303). Moreover, the control unit 504 of the battery system determines whether the access request from EMS 2 is to be permitted or not, based on charge/discharge power information (the condition obtained by subtracting the quantity of electric power allocated to EMS 1 from rated charge/discharge power allowed to be provided from the battery unit (BMU) satisfies contents of the access request from EMS 2) (S1305). Incidentally, determination may be further made based on charge/discharge determination information (whether the discharge request at discharge time/the charge request at charge time is permitted) or charge/discharge control information (whether on-demand operation/scheduled operation is valid or invalid).

Then, the generating unit 505 of the battery system generates a communication message concerned with access permission, and the first communication unit 506 of the battery system transmits the communication message generated by the generating unit 505 to EMS 2 (S1306). In the example of FIG. 12, because both EMS 1 and EMS 2 are permitted for discharge control, the generating units 905 of EMS 1 and EMS 2 generate instruction messages concerned with charge/discharge control and the communication units 906 of EMS 1 and EMS 2 transmit the generated instruction messages to the battery system (S1406). The control unit 504 of the battery system performs charge/discharge control of the power supply unit 501 within an allowable range based on the instruction messages received from EMS 1 and EMS 2 (S1307). When charge/discharge control of EMS 1 is terminated, the generating unit 505 generates a communication message indicating termination of charge/discharge control and the first communication unit 506 transmits the communication message indicating termination of charge/discharge control to EMS 1. When the communication unit 906 of EMS 1 receives the communication message indicating termination of charge/discharge control, the control unit 904 of EMS 1 determines termination of access. The generating unit 905 of EMS 1 generates a communication message concerned with access termination and the communication unit 906 of EMS 1 transmits the generated communication message to the battery system (S1407). The first communication unit 506 of the battery system receives the communication message concerned with access termination of EMS 1 (S1308). The control unit 504 of the battery system terminates access to EMS 1, increases the remaining number of control permits in the access control information of the battery information storage unit 502 by one and stores the access control information in the battery information storage unit 502 so that EMS 2 is set as the control-permitted apparatus. Consequently, another EMS (which is not shown but, for example, may be EMS 3) is hereinafter enabled to make access to the battery system.

Although this embodiment has been described in the case where the battery system permits access based on access control information and charge/discharge power information, the generating unit 505 of the battery system generates a communication message concerned with access rejection and the first communication unit 506 of the battery system transmits the communication message to EMS when the access request is to be rejected (S1304). The communication unit 906 of EMS receives the communication message concerned with access rejection (S1408).

In this manner, according to the charge/discharge instruction apparatus according to the first embodiment, an effect of increasing power throughput resulting from charge/discharge is obtained in a system in which storage batteries and control subjects are connected to one another. Incidentally, the function of the charge/discharge instruction apparatus in the first embodiment can be achieved not only on an EMS provided in a power system grid but also on an HEMS provided on the premises of a home, a BEMS provided on the premises of a building, an FEMS provided on the premises of a factory or a smart meter.

Second Embodiment

The second embodiment relates to a control procedure between a charge/discharge instruction apparatus and a charge/discharge determination apparatus in the case where a battery system makes a scheduled operation for performing charge/discharge control as scheduled based on future schedule information. The system configuration assumed in the second embodiment is the same as the configuration described above with reference to FIG. 1. That is, the system configuration will be described in a situation that the battery system provided on the power utility side or on the consumer side receives instructions concerned with charge/discharge control from plural EMSs.

Figure 15:
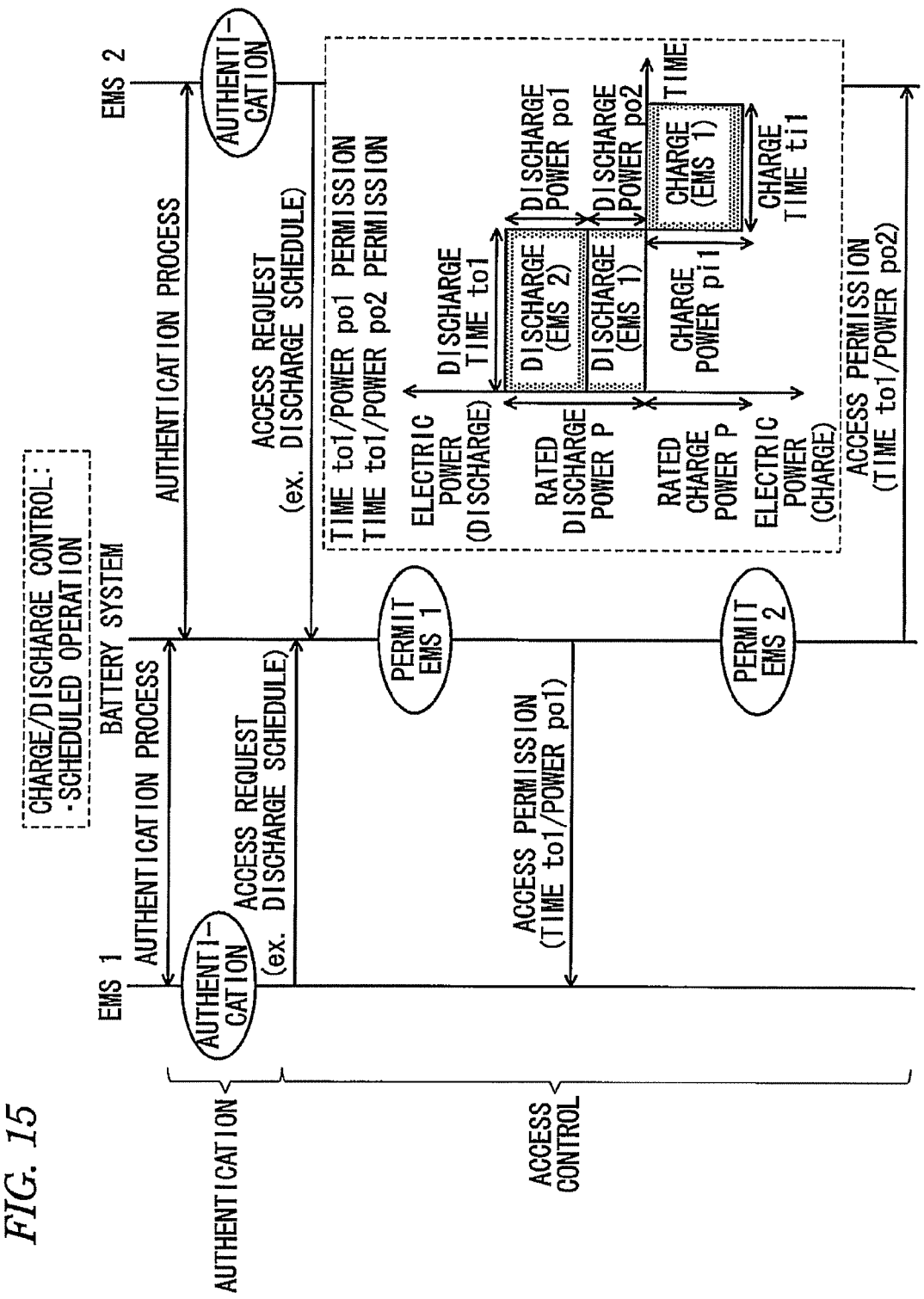
FIG. 15 is a view of an operation sequence in the second embodiment.

FIG. 15 shows an example of an operation sequence in the second embodiment. FIGS. 13 and 14 show flow charts of operation of a charge/discharge determination apparatus and charge/discharge instruction apparatuses in the second embodiment. Although a scene where one battery system operating as the charge/discharge determination apparatus and two EMSs operating as the charge/discharge instruction apparatuses are present is assumed in the example of FIG. 15, the number of each type apparatuses does not depend on any specific number. Assume that the battery system in FIG. 15 makes a scheduled operation requiring a scheduled charge/discharge control instruction based on future schedule information, simultaneous control from plural charge/discharge instruction apparatuses is permitted, the remaining number of control permits in the access control information of FIG. 6A in the charge/discharge determination apparatus is two or more, and scheduled operation in the charge/discharge control information of FIG. 6D is valid. The time interval at which each charge/discharge instruction apparatus notifies the charge/discharge determination apparatus of the scheduled operation may be determined freely to be several hours, one day or one week in accordance with the situation of operation.

The control unit 904 determines whether contents of a charge/discharge control instruction from the charge/discharge instruction unit 901 satisfy the condition of charge/discharge power information stored in the charge/discharge information storage unit 903 or not (S1401). In this embodiment, assume that both EMS 1 and EMS 2 satisfy the condition of charge/discharge power information. When the condition of charge/discharge power information is not satisfied, an authentication process (access request) is not made.

In the example of FIG. 15, each of EMS 1 and EMS 2 performs an authentication process concerned with initial connection to the battery system (S1301 and S1402). Although it is conceived that a communication authentication process based on RFC (Request For Comment) 5191 provided by IETF (Internet Engineering Task Force) or IEEE 802.1X is applied to the authentication process, this embodiment does not depend on any specific authentication process. When the authentication process is completed, the generating unit 905 of EMS 1 generates a communication message concerned with an access request for discharging the battery, and the communication unit 906 of EMS 1 transmits the communication message generated by the generating unit 905 to the battery system (S1403). Particularly, EMS 1 generates a communication message concerned with an access request including the quantity of scheduled power composed of information concerned with charge/discharge power and charge/discharge time as shown in FIG. 11B from charge/discharge power information stored in the charge/discharge information storage unit 903 as shown in FIG. 11A, and transmits the communication message. A method of transmitting a communication message separately from an access request as another method than the method of transmitting a communication message combined with an access request may be used for transmission of the quantity of scheduled power. The first communication unit 506 of the battery system receives the communication message concerned with the access request (S1302). The control unit 504 of the battery system determines whether charge/discharge control is permitted or not, based on information stored in the battery information storage unit 502 and the charge/discharge information storage unit 503 and contents concerned with the access request of EMS 1. In this stage, the battery system has not yet determined whether charge/discharge control of the other EMS 2 is permitted or not. Because the remaining number of control permits in the access control information stored in the battery information storage unit 502 is 2 or more, it can be known that EMS 1 is accessible (S1303). Moreover, because contents of charge/discharge control in the access request satisfy the condition of charge/discharge power information stored in the charge/discharge information storage unit 503 (S1305), the control unit 504 determines whether the access request from EMS 1 is to be permitted or not. At this point of time, the control unit 504 reduces the remaining number of control permits in the access control information by one and stores the access control information in the battery information storage unit 502 so that EMS 1 is allocated as the control-permitted apparatus.

Then, the generating unit 505 of the battery system generates a communication message concerned with access permission, and the first communication unit 506 of the battery system transmits the communication message generated by the generating unit 505 to EMS 1 (S1306). Differently from the case of the first embodiment requiring transmission of an instruction at any time, a method in which information of the quantity of permitted power composed of information concerned with charge/discharge power and charge/discharge time is included in the communication message concerned with the access permission may be used. Although information exchange of access request and access permission corresponds to the concept of semaphore control, a method of transmitting/receiving information of the remaining number of control permits corresponding to semaphore on a communication system can be assumed as another method than the method of storing information of the remaining number of control permits corresponding to semaphore in the battery system. Either method may be used.

After the communication unit 906 of EMS 1 receives the communication message concerned with access permission (S1405), assume that the generating unit 905 of EMS 2 generates a communication message concerned with an access request for charge/discharge control and the communication unit 906 of EMS 2 transmits the communication message concerned with the access request generated by the generating unit 905 to the battery system (S1403). In this stage, because the battery system has already permitted the access request to EMS 1, the control unit 504 of the battery system determines whether the access request for charge/discharge is to be permitted or not, based on information stored in the battery information storage unit 502 and the charge/discharge information storage unit 503 and information concerned with the access request from EMS 2.

In this embodiment 2, because it is desirable that information of the quantity of scheduled power is included in the access permission request, assume that information of the quantity of scheduled power to be used from the battery system is included in EMS 2 in the same manner as in EMS 1. In the example of FIG. 13, it can be known that EMS 2 is accessible, from access control information indicating that the remaining number of control permits is one or more (S1303). Moreover, the control unit 504 of the battery system determines whether the access request from EMS 2 is to be permitted or not, based on charge/discharge power information (the condition obtained by subtracting the quantity of electric power allocated to EMS 1 from rated charge/discharge power allowed to be provided from the battery unit (BMU) satisfies contents of the access request from EMS 2) (S1305). Incidentally, determination may be further made based on charge/discharge determination information (whether the discharge request at discharge time/the charge request at charge time is permitted) or charge/discharge control information (whether on-demand operation/scheduled operation is valid or invalid). Particularly, determination based on charge/discharge power information as to whether the access request for charge/discharge control is to be permitted or not, is an important process for achievement of both safety and power throughput of the battery system.

Assume that the quantity of rated power concerned with discharge in the battery system is P(W) as shown in the example of FIG. 13. When the quantity of scheduled power concerned with discharge of EMS 1 is power po1(W) for time to1(*h*) and the quantity of scheduled power concerned with discharge of EMS 2 is power po2(W) for time to1(*h*) in this situation, simultaneous discharge control can be permitted for both EMS 1 and EMS 2 if a result of addition of po1(W) and po2(W) is not higher than P(W) because the same time zone is used. In the example of FIG. 13, the case of determination at charge time is shown likewise. Charge control can be permitted if the quantity of scheduled power pi1 concerned with charge of EMS 1 is not higher than the quantity of rated power P(W) concerned with charge of the battery system.

Then, the generating unit 505 of the battery system generates a communication message concerned with access permission, and the first communication unit 506 of the battery system transmits the communication message generated by the generating unit 505 to EMS 2 (S1306). In the example of FIG. 13, because both EMS 1 and EMS 2 are permitted for discharge control in the same time zone, the generating units 905 of EMS 1 and EMS 2 generate instruction messages concerned with charge/discharge control, and the communication units 906 of EMS 1 and EMS 2 transmit the generated instruction messages to the battery system (S1406). The control unit 504 of the battery system performs charge/discharge control of the power supply unit 501 within an allowable range based on the instruction messages received from EMS 1 and EMS 2 (S1307). Though not shown, when charge/discharge control of EMS 1 is terminated, the generating unit 505 generates a communication message indicating termination of charge/discharge control and the first communication unit 506 transmits the communication message indicating termination of charge/discharge control to EMS 1. When the communication unit 906 of EMS 1 receives the communication message indicating termination of charge/discharge control, the control unit 904 of EMS 1 determines termination of access. When discharge control is terminated, the generating unit 905 of EMS 1 generates a communication message concerned with access termination and the communication unit 906 of EMS 1 transmits the generated communication message to the battery system (S1407). The first communication unit 506 of the battery system receives the communication message concerned with access termination of EMS 1 (S1308). The control unit 504 of the battery system terminates access to EMS 1, increases the remaining number of control permits in the access control information of the battery information storage unit 502 by one, and stores the access control information in the battery information storage unit 502 so that EMS 2 is set as the control-permitted apparatus. Consequently, another EMS (which is not shown but, for example, may be EMS 3) is hereinafter enabled to make access to the battery system.

Although this embodiment has been described in the case where the battery system permits access based on access control information and charge/discharge power information, the generating unit 505 of the battery system generates a communication message concerned with access rejection and the first communication unit 506 of the battery system transmits the communication message to EMS when the access request is to be rejected (S1304). The communication unit 906 of EMS receives the communication message concerned with access rejection (S1408).

In this manner, according to the charge/discharge instruction apparatus according to the second embodiment, an effect of increasing power throughput resulting from charge/discharge is obtained in the case where scheduled charge/discharge control based on future schedule information is used.

Third Embodiment

The third embodiment relates to a control procedure between a charge/discharge instruction apparatus and a charge/discharge determination apparatus in the case where a battery system makes an on-demand operation for suitably transmitting/receiving communication messages concerned with charge/discharge control instructions. The system configuration assumed in the third embodiment is the same as the configuration described above with reference to FIG. 1. That is, the system configuration will be described in a situation that the battery system provided on the power utility side or on the consumer side receives instructions concerned with charge/discharge control from plural EMSs.

Figure 16:
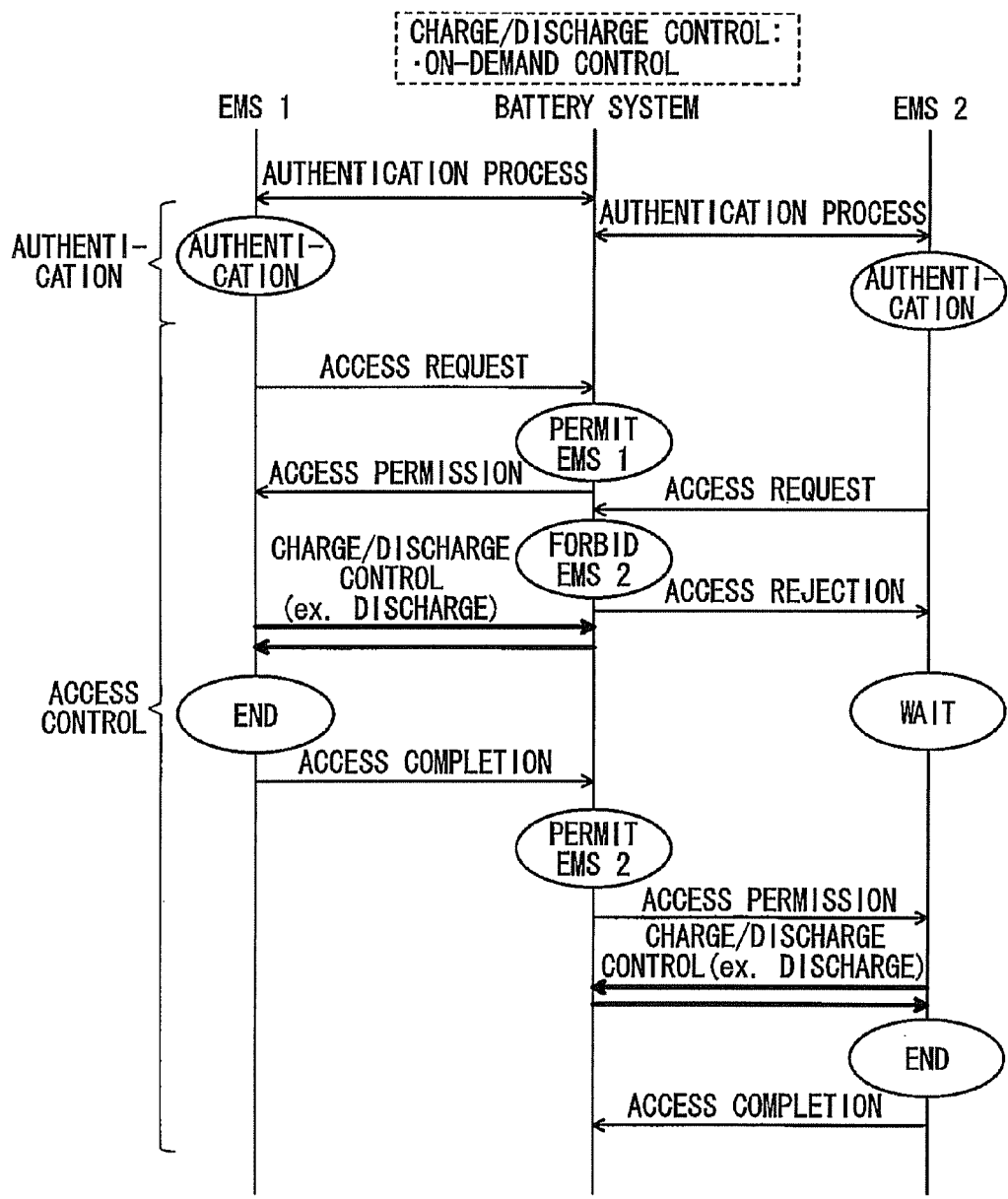
FIG. 16 is a view of an operation sequence in a third embodiment.
Figure 17:
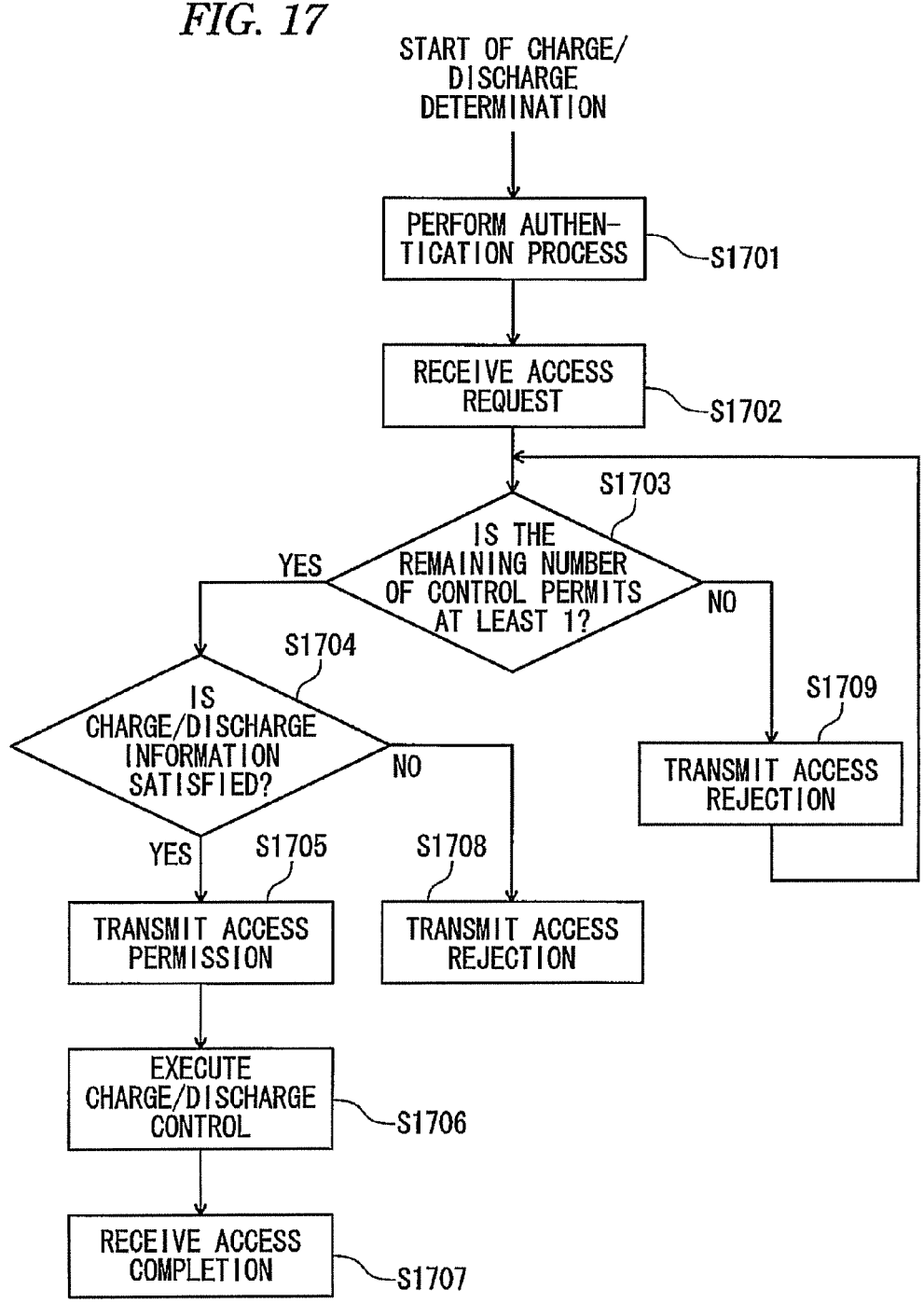
FIG. 17 is a flow chart of operation of the charge/discharge determination apparatus in the third embodiment.
Figure 18:
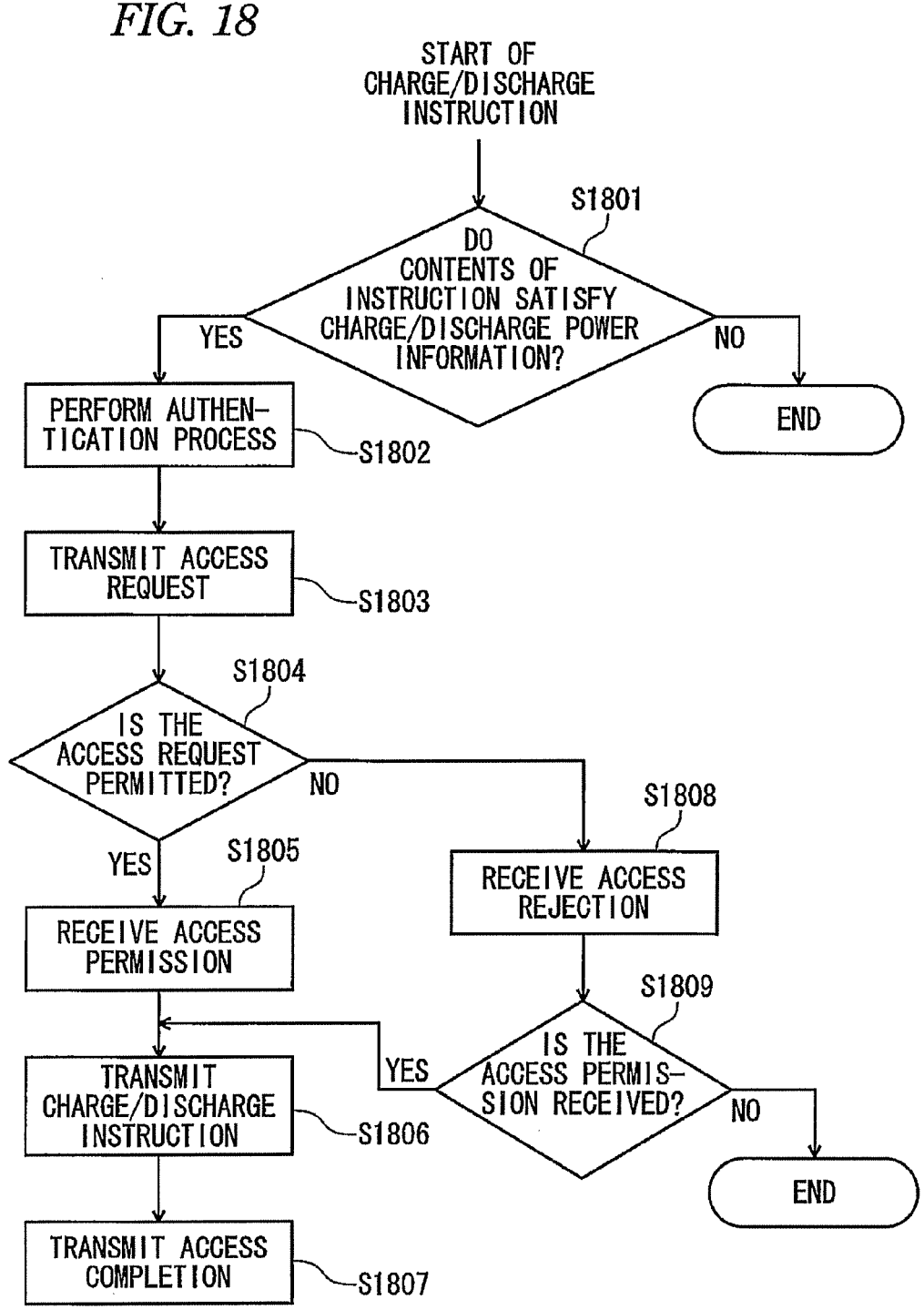
FIG. 18 is a flow chart of operation of the charge/discharge instruction apparatus in the third embodiment.

FIG. 16 shows an example of an operation sequence in the third embodiment. FIGS. 17 and 18 show flow charts of operation of a charge/discharge determination apparatus and charge/discharge instruction apparatuses in the third embodiment. Although a scene where one battery system operating as the charge/discharge determination apparatus and two EMSs operating as the charge/discharge instruction apparatuses are present is assumed in the example of FIG. 16, the number of each type apparatuses does not depend on any specific number. Assume that the battery system in FIG. 16 makes an on-demand operation requiring a charge/discharge control instruction at any time, simultaneous control from plural charge/discharge instruction apparatuses is forbidden, the remaining number of control permits in the access control information of FIG. 6A in the charge/discharge determination apparatus is one, and on-demand operation in the charge/discharge control information of FIG. 6D is valid.

The operation procedure in the third embodiment in FIG. 16 operates in the same manner as in the first embodiment shown in FIG. 12. This embodiment is different in that the battery system forbids simultaneous control of plural EMSs.

The control unit 904 determines whether contents of the charge/discharge control instruction from the charge/discharge instruction unit 901 satisfy the condition of charge/discharge power information in the charge/discharge information storage unit 903 or not (S1801). In this embodiment, assume that both EMS 1 and EMS 2 satisfy the condition of charge/discharge power information. When the condition of charge/discharge power information is not satisfied, the authentication process (access request) is not performed.

In FIG. 16, each of EMS 1 and EMS 2 performs an authentication process concerned with initial connection to the battery system (S1701 and S1802). Although it is conceived that a communication authentication process based on RFC (Request For Comment) 5191 provided by IETF (Internet Engineering Task Force) or IEEE 802.1X is applied to the authentication process, this embodiment does not depend on any specific authentication process. When the authentication process is completed, the generating unit 905 of EMS 1 generates a communication message concerned with an access request for discharging the battery, and the communication unit 906 of EMS 1 transmits the generated communication message to the battery system (S1803). The first communication unit 506 of the battery system receives the communication message concerned with the access request (S1702). The control unit 504 of the battery system determines whether the access request is permitted or not, based on information stored in the battery information storage unit 502 and the charge/discharge information storage unit 503 and contents concerned with the access request of EMS 1. In this stage, the battery system has not yet determined whether charge/discharge control of the other EMS 2 is permitted or not. Because the remaining number of control permits in the access control information stored in the battery information storage unit 502 is one, it can be known that EMS 1 is accessible (S1703). Moreover, because contents of charge/discharge control in the access request satisfy the condition of charge/discharge power information stored in the charge/discharge information storage unit 503, the control unit 504 determines whether the access request from EMS 1 is to be permitted or not (S1704). Although description has been made here in the case where whether the access request is to be permitted or not, is determined based on access control information ad charge/discharge power information, determination may be further made based on charge/discharge determination information (whether the discharge request at discharge time/the charge request at charge time is permitted) and charge/discharge control information (whether on-demand operation/scheduled operation is valid or invalid). At this point of time, the control unit 504 reduces the remaining number of control permits in the access control information by one and stores the access control information in the battery information storage unit 502 so that EMS 1 is allocated as the control-permitted apparatus.

Then, the generating unit 505 of the battery system generates a communication message concerned with access permission, and the first communication unit 506 of the battery system transmits the communication message generated by the generating unit 505 to EMS 1 (S1705). Because EMS 1 is permitted for charge/discharge control, the generating unit 905 of EMS 1 generates an instruction message concerned with charge/discharge control, and the communication unit 906 of EMS 1 transmits the generated instruction message to the battery system (S1806). The control unit 504 of the battery system performs charge/discharge control of the power supply unit 501 within an allowable range based on the instruction message received from EMS 1 (S1706).

On the other hand, after the communication unit 906 of EMS 1 receives the communication message concerned with access permission (S1805), the generating unit 905 of EMS 2 generates a communication message concerned with an access request for charge/discharge control and the communication unit 906 of EMS 2 transmits the communication message generated by the generating unit 905 to the battery system (S1803). The battery system has already permitted the access request for charge/discharge control to EMS 1. Whether charge/discharge control is permitted or not, is determined based on information stored in the battery information storage unit 502 and the charge/discharge information storage unit 503 and information concerned with the access request from EMS 2. In the example of FIG. 16, because the remaining number of control permits in the access control information stored in the battery information storage unit 502 is zero, the control unit 504 of the battery system determines that the access request to EMS 2 is rejected (S1703). Then, the generating unit 505 of the battery system generates a communication message concerned with access rejection, and the first communication unit 506 of the battery system transmits the communication message generated by the generating unit 505 to EMS 2 (S1709).

When the communication unit 906 of EMS 2 receives the communication message concerned with access rejection (S1808), the control unit 904 of EMS 2 waits for reception of a communication message concerned with access permission from the battery system. When charge/discharge control from EMS 1 is terminated, the generating unit 505 of the battery system generates a communication message indicating termination of charge/discharge control and the first communication unit 506 of the battery system transmits the communication message indicating termination of charge/discharge control and generated by the generating unit 505, to EMS 1. When the communication unit 906 of EMS 1 receives the communication message indicating termination of charge/discharge control, the control unit 904 of EMS 1 determines termination of access and the generating unit 905 of EMS 1 generates a communication message concerned with access termination. The communication unit 906 of EMS 1 transmits the communication message generated by the generating unit 905 to the battery system (S1807). When the first communication unit 506 of the battery system receives the communication message concerned with access termination (S1707), the control unit 504 of the battery system changes the remaining number of control permits in the access control information of the battery information storage unit 502 from 0 to 1, and stores the access control information in the battery information storage unit 502 so that EMS 1 as the control-permitted apparatus is deleted. On this occasion, because the remaining number of control permits is one, the control unit 504 can know that EMS 2 is accessible (S1703). Moreover, because contents of charge/discharge control in the access request satisfy the condition of charge/discharge power information stored in the charge/discharge information storage unit 503, the control unit 504 determines whether the access request from EMS 2 is to be permitted or not (S1704). Although whether the access request is to be permitted or not, is determined here based on the access control information and the charge/discharge power information, determination may be further made based on charge/discharge determination information (whether the discharge request at discharge time/the charge request at charge time is permitted) and charge/discharge control information (whether on-demand operation/scheduled operation is valid or invalid). At this point of time, the control unit 504 reduces the remaining number of control permits in the access control information by one and stores the access control information in the battery information storage unit 502 so that EMS 2 is allocated as the control-permitted apparatus.

The generating unit 505 generates a communication message concerned with access permission for EMS 2 and the first communication unit 506 transmits the communication message generated by the generating unit 505 to EMS 2 (S1705). When the communication unit 906 of EMS 2 receives the communication message concerned with access permission (S1809), EMS 2 is permitted for charge/discharge control. Accordingly, the generating unit 905 of EMS 2 generates an instruction message concerned with charge/discharge control and the communication unit 906 of EMS 2 transmits the generated instruction message to the battery system (S1806). The control unit 504 of the battery system performs charge/discharge control of the power supply unit 501 within an allowable range based on the instruction message received from EMS 2 (S1706). When charge/discharge control of EMS 2 is terminated, the generating unit 505 generates a communication message indicating termination of charge/discharge control and the first communication unit 506 transmits the communication message indicating termination of charge/discharge control to EMS 2. When the communication unit 906 of EMS 2 receives the communication message indicating termination of charge/discharge control, the control unit 904 of EMS 2 determines termination of access and the generating unit 905 of EMS 2 generates a communication message concerned with access termination. The communication unit 906 of EMS 2 transmits the generated communication message to the battery system (S1807). The first communication unit 506 of the battery system receives the communication message concerned with access termination from EMS 2 (S1707), the control unit 504 of the battery system terminates access to EMS 2, changes the remaining number of control permits in the access control information of the battery information storage unit 502 to one, and stores the access control information in the battery information storage unit 502 so that no control-permitted apparatus remains. Consequently, another EMS can hereinafter gain access to the battery system.

Although this embodiment has been described in the case where the battery system permits access based on charge/discharge power information, the generating unit 505 of the battery system generates a communication message concerned with access rejection and the first communication unit 506 of the battery system transmits the communication message to EMS when the access request is to be rejected because the condition of charge/discharge power information is not satisfied (S1708). The communication unit 906 of EMS receives the communication message concerned with access rejection (S1808). In this case, the battery system is not instructed for charge/discharge control because a communication message concerned with access permission is then not received any more (S1809).

In this manner, according to the charge/discharge instruction apparatus according to the third embodiment of the invention, an effect of increasing power throughput resulting from charge/discharge is obtained even when charge/discharge control of EMS 1 and EMS 2 over the battery system operating on demand is made entirely exclusively. Although the third embodiment has been described in the case where EMS waits for reception of a communication message concerned with access permission, the invention is not limited thereto. Alternatively, EMS may transmit an access request to another battery system.

Fourth Embodiment

The fourth embodiment relates to a control procedure between a charge/discharge determination apparatus and a charge/discharge instruction apparatus in the case where a battery system makes a scheduled operation for performing charge/discharge control as scheduled based on future schedule information. The system configuration assumed in the fourth embodiment is the same as the configuration described above with reference to FIG. 1. That is, the system configuration will be described in a situation that the battery system provided on the power utility side or on the consumer side receives instructions concerned with charge/discharge control from plural EMSs.

Figure 19:
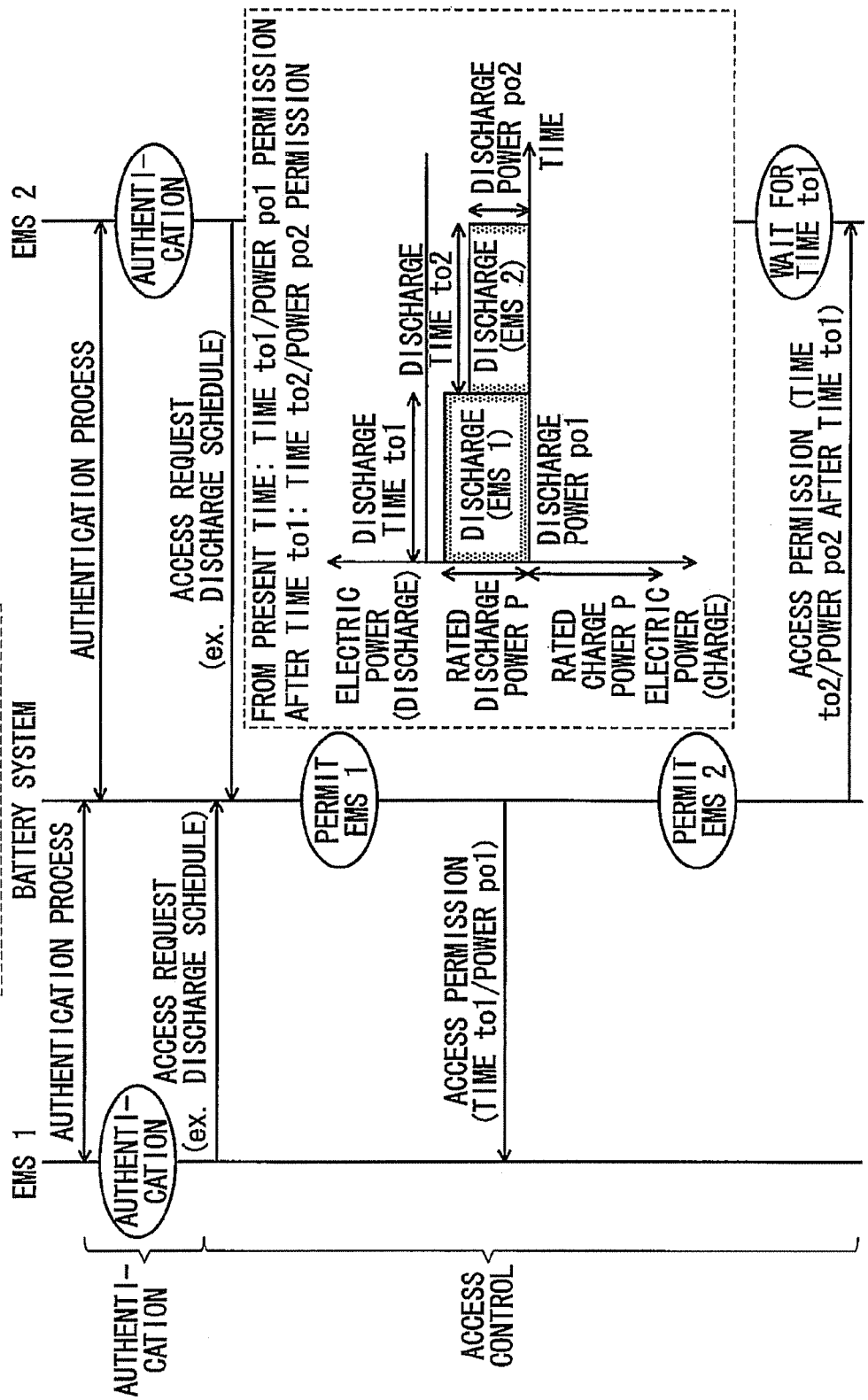
FIG. 19 is a view of an operation sequence in the fourth embodiment.
Figure 20:
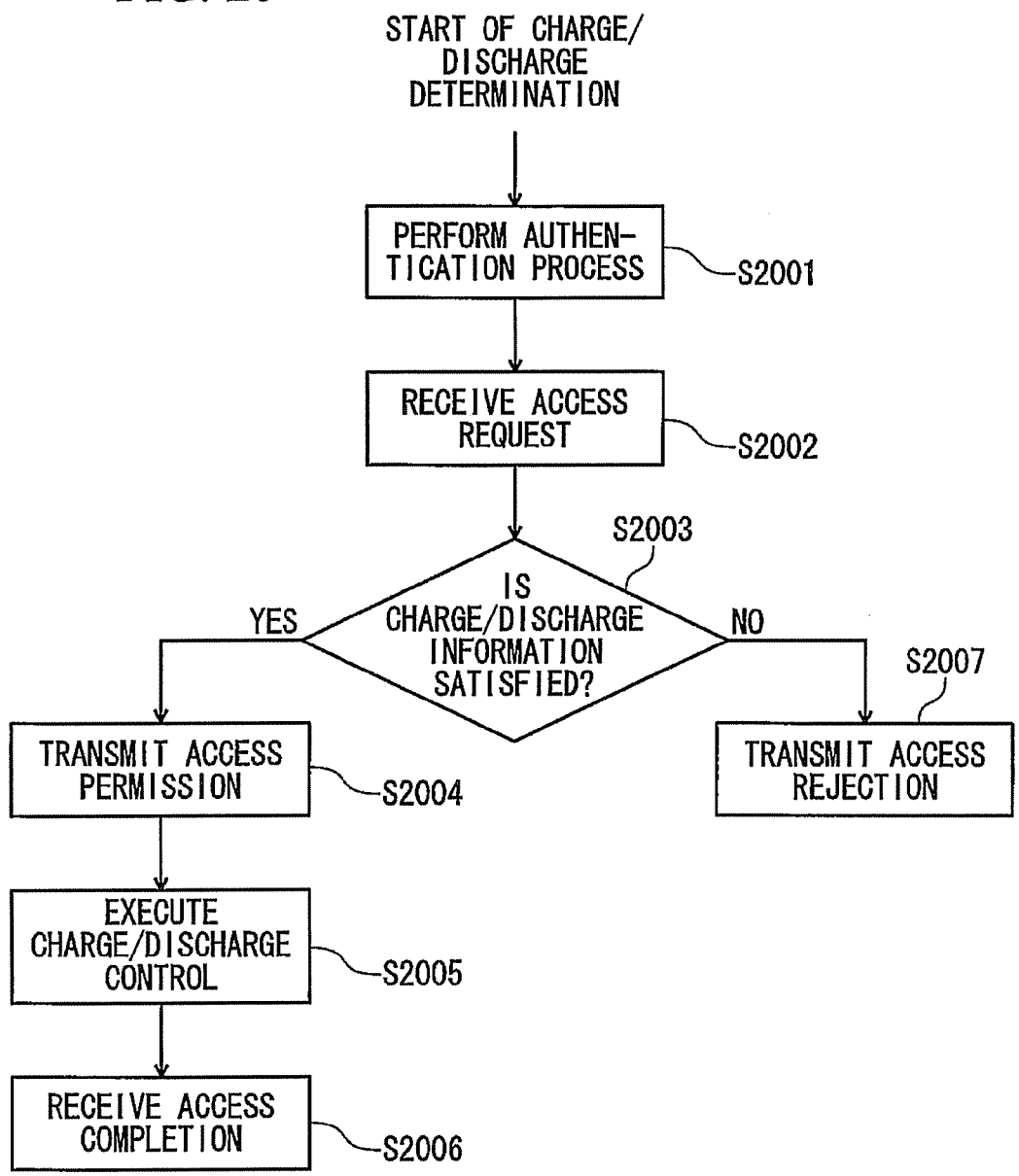
FIG. 20 is a flow chart of operation of the charge/discharge determination apparatus in the fourth embodiment.

FIG. 19 shows an example of an operation sequence in the fourth embodiment. FIGS. 20 and 14 show flow charts of operation of a charge/discharge determination apparatus and charge/discharge instruction apparatuses in the fourth embodiment. Although a scene where one battery system operating as the charge/discharge determination apparatus and two EMSs operating as the charge/discharge instruction apparatuses are present is assumed in the example of FIG. 19, the number of each type apparatuses does not depend on any specific number. Assume that the battery system in FIG. 19 makes a scheduled operation for performing charge/discharge control as scheduled based on future schedule information, and simultaneous control from plural charge/discharge instruction apparatuses is forbidden. In this case, the remaining number of control permits in the access control information of FIG. 6A in the charge/discharge determination apparatus is one, and scheduled operation in the charge/discharge control information of FIG. 6D is valid. The time interval at which each charge/discharge instruction apparatus notifies the charge/discharge determination apparatus of the scheduled information may be determined freely to be several hours, one day or one week in accordance with the situation of operation.

In the operation procedure in the fourth embodiment in FIG. 19, the same operation as in the second embodiment shown in FIG. 15 is made. The difference is in that the battery system forbids simultaneous control of plural EMSs.

The control unit 904 determines whether contents of a charge/discharge control instruction from the charge/discharge instruction unit 901 satisfy the condition of charge/discharge power information stored in the charge/discharge information storage unit 903 or not (S1401). In this embodiment, assume that both EMS 1 and EMS 2 satisfy the condition of charge/discharge power information. When the condition of charge/discharge power information is not satisfied, an authentication process (access request) is not made.

In the example of FIG. 19, each of EMS 1 and EMS 2 performs an authentication process concerned with initial connection to the battery system (S1402 and S2001). Although it is conceived that a communication authentication process based on RFC (Request For Comment) 5191 provided by IETF (Internet Engineering Task Force) or IEEE 802.1X is applied to the authentication process, this embodiment does not depend on any specific authentication process. When the authentication process is completed, the generating unit 905 of EMS 1 generates a communication message concerned with an access request for discharging the battery, and the communication unit 906 of EMS 1 transmits the communication message generated by the generating unit 905 to the battery system (S1403). Particularly, EMS 1 generates a communication message concerned with an access request including the quantity of scheduled power composed of information concerned with charge/discharge power and charge/discharge time as shown in FIG. 11B from charge/discharge power information stored in the charge/discharge information storage unit 903 as shown in FIG. 11A, and transmits the communication message. A method of transmitting a communication message separately from an access request as another method than the method of transmitting a communication message combined with an access request may be used for transmission of the quantity of scheduled power. When the first communication unit 506 of the battery system receives the communication message concerned with the access request (S2002), the control unit 504 of the battery system determines whether charge/discharge control is permitted or not, based on information stored in the battery information storage unit 502 and the charge/discharge information storage unit 503 and contents concerned with the access request of EMS 1. In this stage, the battery system has not yet determined whether charge/discharge control of the other EMS 2 is permitted or not. Because the remaining number of control permits in the access control information stored in the battery information storage unit 502 is one, it can be known that EMS 1 is accessible. Moreover, because contents of charge/discharge control in the access request satisfy the condition of charge/discharge power information stored in the charge/discharge information storage unit 503, the control unit 504 determines whether the access request from EMS 1 is to be permitted or not (S2003). At this point of time, the control unit 504 sets the remaining number of control permits in the access control information at zero and stores the access control information in the battery information storage unit 502 so that EMS 1 is allocated as the control-permitted apparatus.

Then, the generating unit 505 of the battery system generates a communication message concerned with access permission, and the first communication unit 506 of the battery system transmits the communication message generated by the generating unit 505 to EMS 1 (S2004). A method in which information of the quantity of permitted power composed of information concerned with charge/discharge power and charge/discharge time is included in the communication message concerned with the access request may be used. Although information exchange of access request and access permission corresponds to the concept of semaphore control, a method of transmitting/receiving information of the remaining number of control permits corresponding to semaphore on a communication system can be assumed as another method than the method of storing information of the remaining number of control permits corresponding to semaphore in the battery system. Either method may be used.

After the communication unit 906 of EMS 1 receives the communication message concerned with access permission (S1405), because EMS 1 is permitted previously for discharge control under the condition of discharge time to1 and discharge power po1 based on charge/discharge power information in the example of FIG. 19, the generating unit 905 of EMS 1 generates an instruction message concerned with charge/discharge control and the communication unit 906 of EMS 1 transmits the generated instruction message to the battery system (S1406). The control unit 504 of the battery system performs charge/discharge control of the power supply unit 501 within an allowable range based on the instruction message received from EMS 1 (S2005). Though not shown, when charge/discharge control of EMS 1 is terminated, the generating unit 505 generates a communication message indicating termination of charge/discharge control and the first communication unit 506 transmits the communication message indicating termination of charge/discharge control to EMS 1. When the communication unit 906 of EMS 1 receives the communication message indicating termination of charge/discharge control, the control unit 904 of EMS 1 determines termination of access. When discharge control is terminated, the generating unit 905 of EMS 1 generates a communication message concerned with access termination and the communication unit 906 of EMS 1 transmits the generated communication message to the battery system (S1407). The first communication unit 506 of the battery system receives the communication message concerned with access termination of EMS 1 (S2006). The control unit 504 of the battery system terminates access to EMS 1, increases the remaining number of control permits in the access control information of the battery information storage unit 502 by one, and stores the access control information in the battery information storage unit 502 so that EMS 2 is set as the control-permitted apparatus. Consequently, another EMS (e.g. EMS 2) can hereinafter gain access to the battery system.

On the other hand, after the communication unit 906 of EMS 1 receives the communication message concerned with access permission (S1405), assume that the generating unit 905 of EMS 2 generates a communication message concerned with an access request for charge/discharge control and the communication unit 906 of EMS 2 transmits the communication message concerned with the access request and generated by the generating unit 905 to the battery system (S1403). The battery system has already permitted the access request for charge/discharge control to EMS 1. The battery system determines whether charge/discharge control is permitted or not, based on information stored in the battery information storage unit 502 and the charge/discharge information storage unit 503 and information concerned with the access request from EMS 2 (S2003). In the example of FIG. 19, because the remaining number of control permits in the access control information of the battery information storage unit 502 is zero, the control unit 504 of the battery system does not transmit a communication message concerned with access permission to EMS 2 at the present point of time. In the case of this embodiment, start time and end time of charge/discharge control and charge/discharge power are included in the communication message concerned with the access request of each of EMS 1 and EMS 2. Specifically, because the discharge start time of EMS 2 is after the charge/discharge end time of EMS 1 as shown in FIGS. 11B and 19, a communication message concerned with access permission of EMS 2 is transmitted to EMS 2 after to1 since the charge/discharge control start time of EMS 1 (S2004).

After the communication unit 906 of EMS 2 receives the communication message concerned with access permission (S1405), because EMS 2 is permitted for discharge control under the condition of discharge time to2 and discharge power po2 based on charge/discharge power information after to1 since the charge/discharge control start time of EMS 1 in the example of FIG. 19, the generating unit 905 of EMS 2 generates an instruction message concerned with charge/discharge control and the communication unit 906 of EMS 2 transmits the generated instruction message to the battery system (S1406). The control unit 504 of the battery system performs charge/discharge control of the power supply unit 501 within an allowable range based on the instruction message received from EMS 2 (S2005). Though not shown, when charge/discharge control of EMS 2 is terminated, the generating unit 505 generates a communication message indicating termination of charge/discharge control and the first communication unit 506 transmits the communication message indicating termination of charge/discharge control to EMS 2. When the communication unit 906 of EMS 2 receives the communication message indicating termination of charge/discharge control, the control unit 904 of EMS 2 determines termination of access. When discharge control is terminated, the generating unit 905 of EMS 2 generates a communication message concerned with access termination and the communication unit 906 of EMS 2 transmits the generated communication message to the battery system (S1407). The first communication unit 506 of the battery system receives the communication message concerned with access termination of EMS 2 (S2006). The control unit 504 of the battery system terminates access to EMS 2, increases the remaining number of control permits in the access control information of the battery information storage unit 502 by one, and stores the access control information in the battery information storage unit 502 so that EMS 2 is set as the control-permitted apparatus.

Although this embodiment has been described in the case where the battery system permits access based on charge/discharge power information, the generating unit 505 of the battery system generates a communication message concerned with access rejection and the first communication unit 506 of the battery system transmits the communication message to EMS when the access request is to be rejected (S2007). The communication unit 906 of EMS receives the communication message concerned with access rejection (S1408).

In this manner, according to the charge/discharge instruction apparatus according to the fourth embodiment, use of information of the quantity of scheduled power makes it possible to pack charge/discharge control schedules without any time spaced therebetween.

As shown in the example of FIG. 19, discharge power po1(W) for time to2 in EMS 2 can be started immediately after discharge power po1(W) for time to1 in EMS 1 is terminated. In comparison with the case where the quantity of scheduled power is not exchanged between the charge/discharge determination apparatus and the charge/discharge instruction apparatus, transmission/reception of various communication messages by a polling method can be reduced efficiently.

Fifth Embodiment

Figure 21:
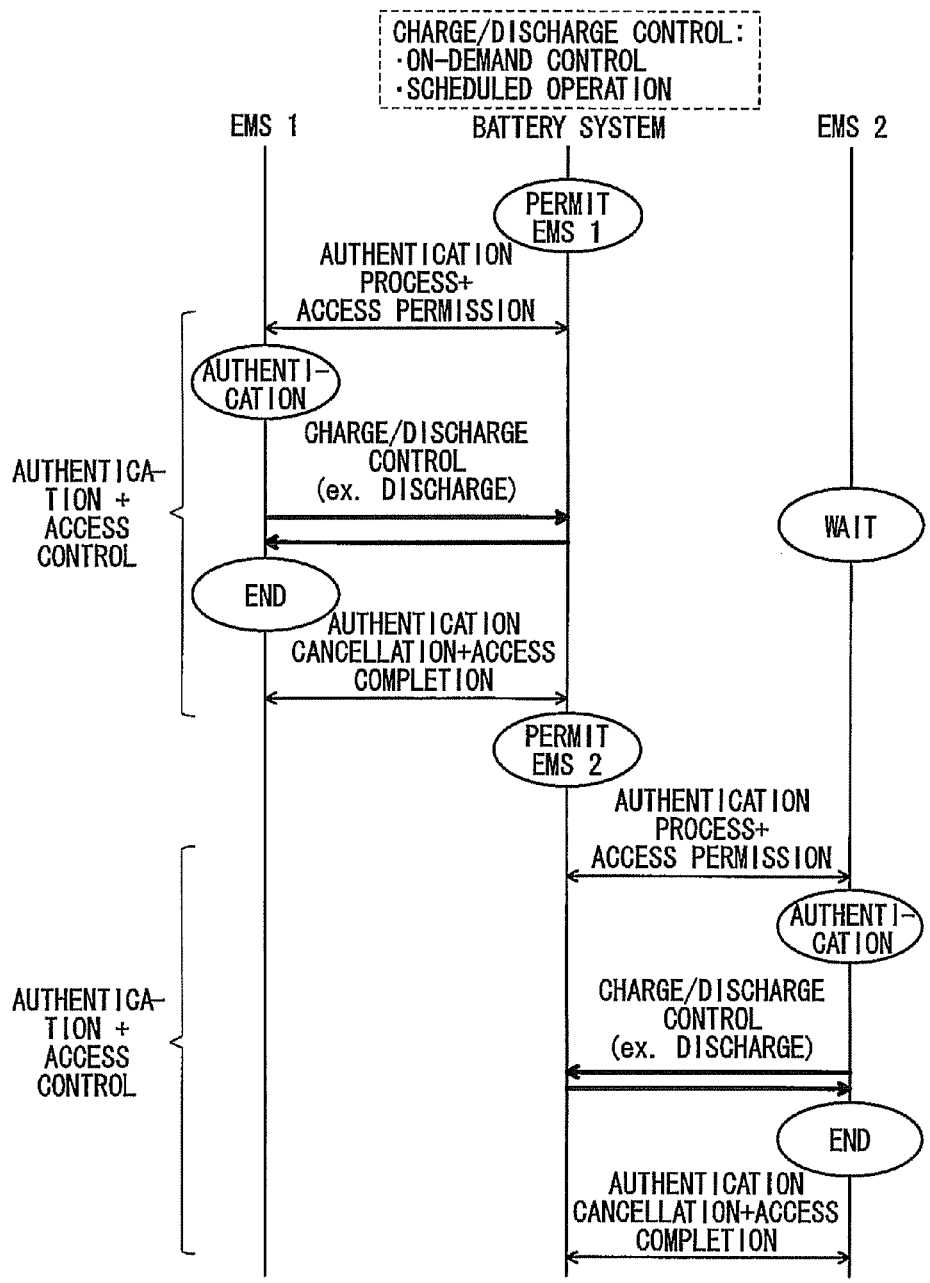
FIG. 21 is a view of an operation sequence in a fifth embodiment.
Figure 22:
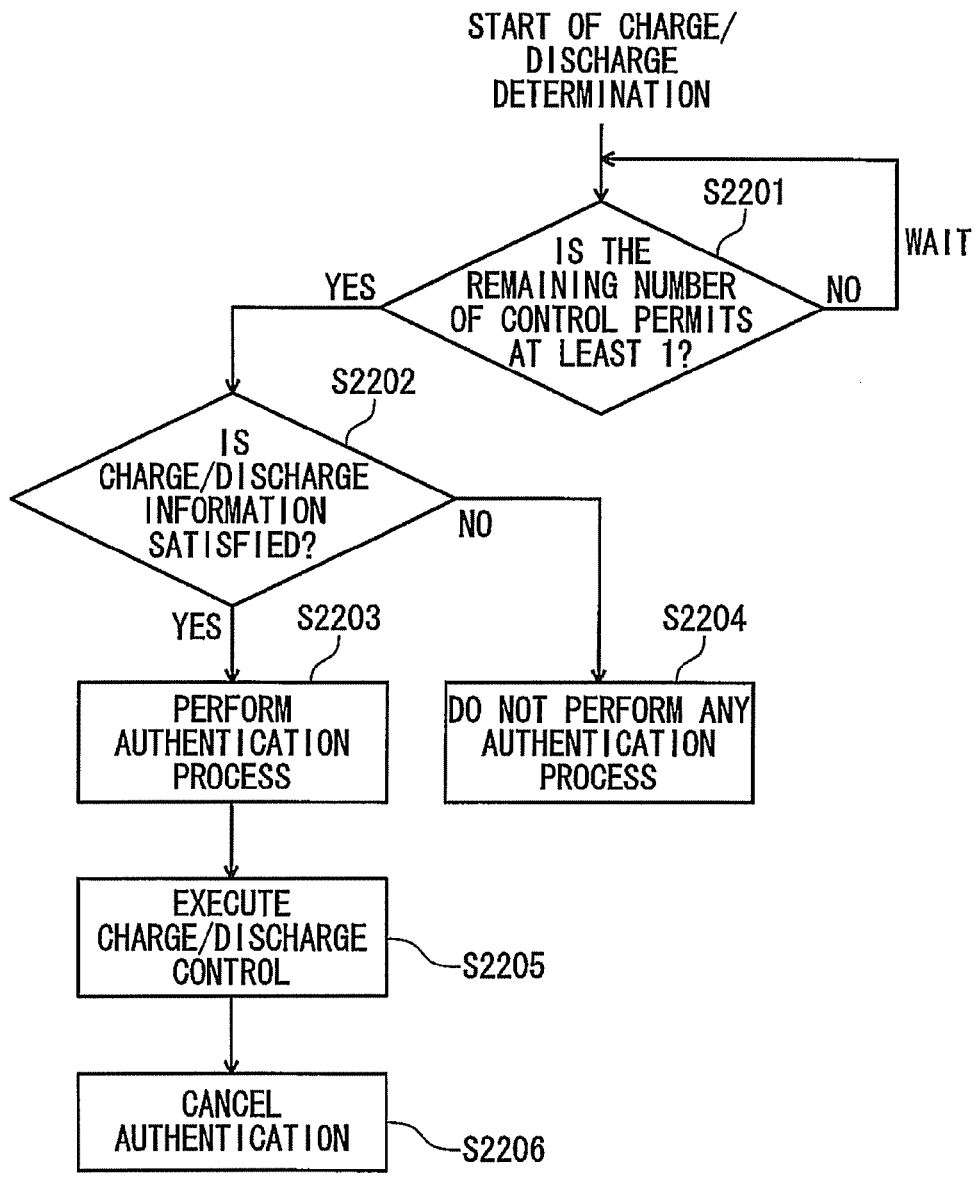
FIG. 22 is a flow chart of operation of the charge/discharge determination apparatus in the fifth embodiment.
Figure 23:
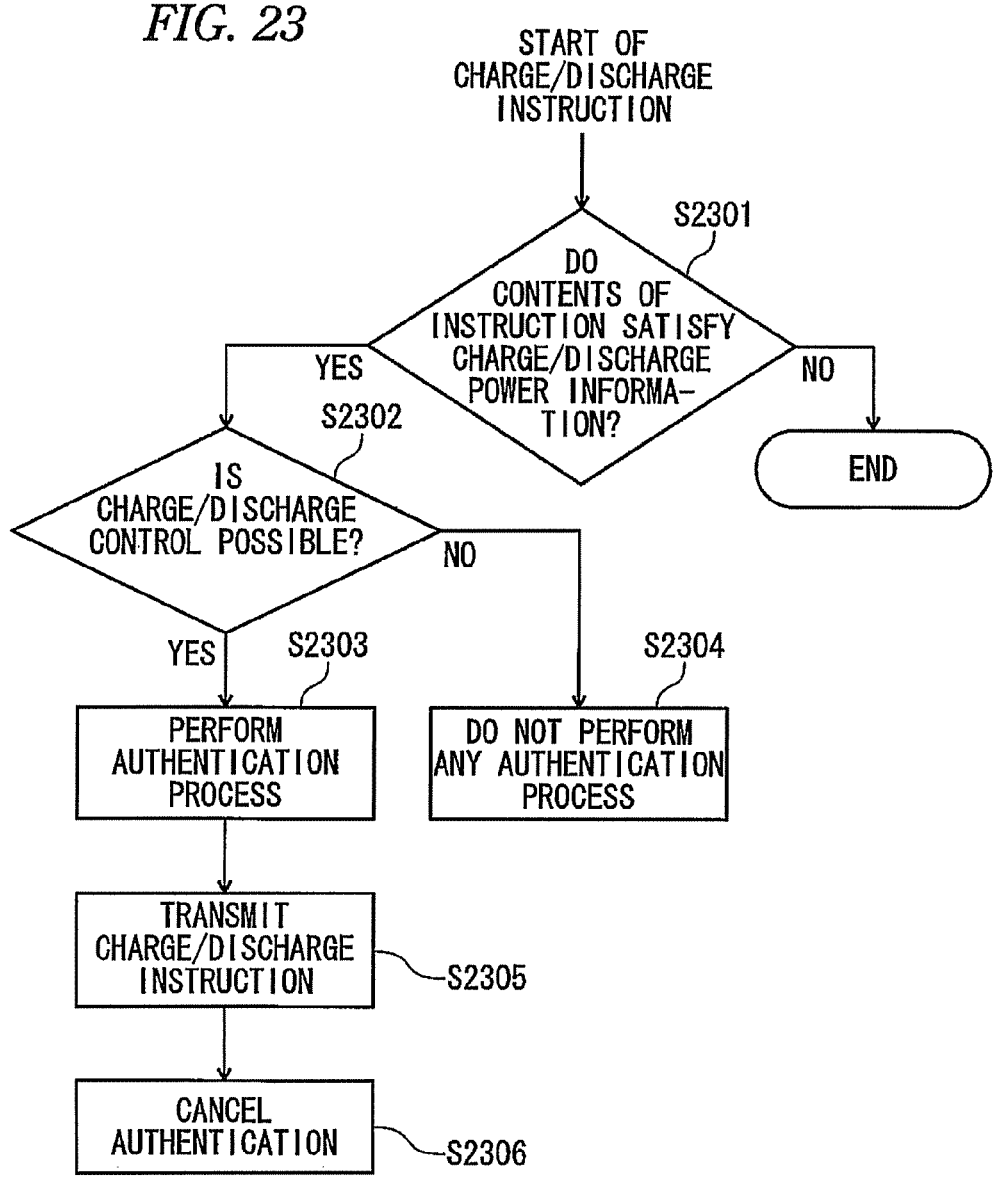
FIG. 23 is a flow chart of operation of the charge/discharge instruction apparatus in the fifth embodiment.

The fifth embodiment relates to determination as to whether charge/discharge control is permitted or not, using an authentication process. FIG. 21 shows an example of an operation sequence in the fifth embodiment. FIGS. 22 and 23 show flow charts of operation of a charge/discharge determination apparatus and charge/discharge instruction apparatuses in the fifth embodiment. Although a scene where one battery system operating as the charge/discharge determination apparatus and two EMSs operating as the charge/discharge instruction apparatuses are present is assumed in the example of FIG. 21, the number of each type apparatuses does not depend on any specific number. Assume that the charge/discharge determination apparatus and the charge/discharge instruction apparatuses perform charge/discharge control after executing an authentication procedure such as RFC 5191, IEEE802.1X, etc. as described above. In this case, when the initial value of the remaining number of control permits in the access control information shown in FIG. 6A in the battery information storage unit 502 of the charge/discharge determination apparatus is set at 1 and the initial value of the remaining number of authentication potentialities in the authentication information shown in FIG. 6E is set at 1, completion of the authentication process can be regarded as determination as to whether charge/discharge is permitted or not because charge/discharge control from plural charge/discharge instruction apparatuses in the same time zone is forbidden.

The control unit 904 of EMS determines whether contents of a charge/discharge control instruction from the charge/discharge instruction unit 901 satisfy the condition of charge/discharge power information in the charge/discharge information storage unit 903 or not (S2301). In this embodiment, assume that both EMS 1 and EMS 2 satisfy the condition of charge/discharge power information. When the condition of charge/discharge power information is not satisfied, the authentication process is not executed.

The communication unit 906 of EMS 1 transmits a communication message concerned with an authentication request for an authentication process to the battery system. For example, the communication message concerned with the authentication request may include information of charge/discharge time and charge/discharge power as contents of charge/discharge control or a communication message including contents of charge/discharge control may be transmitted separately. When the first communication unit 506 of the battery system receives the authentication request, the control unit 504 of the battery system finds from charge/discharge power information of the charge/discharge information storage unit 503 that the remaining number of control permits in the access control information is 1 so that the battery system can perform the authentication process with EMS 1 (S2201). Moreover, because contents of charge/discharge control of EMS 1 satisfy the condition of charge/discharge power information stored in the charge/discharge information storage unit 503 (S2202), EMS 1 and the battery system perform the authentication process (S2203 and S2303). At this point of time, the control unit 504 stores the access control information in the battery information storage unit 502 so that the remaining number of control permits is set at zero and EMS 1 is allocated as the control-permitted apparatus. Although it is conceived that a communication authentication process based on RFC (Request For Comment) 5191 provided by IETF (Internet Engineering Task Force) or IEEE 802.1X is applied to the authentication process, this embodiment does not depend on any specific authentication process.

The generating unit 905 of EMS 1 generates an instruction message concerned with charge/discharge control and the communication unit 906 of EMS 1 transmits the generated instruction message to the battery system (S2305). The control unit 504 of the battery system performs charge/discharge control of the power supply unit 501 within an allowable range based on the instruction message received from EMS 1 (S2205). When charge/discharge control from EMS 1 is terminated, EMS 1 and the battery system execute authentication cancellation (S2206 and S2306). The control unit 504 of the battery system terminates access to EMS 1, increases the remaining number of control permits in the access control information of the battery information storage unit 502 by one and stores the access control information in the battery information storage unit 502 so that EMS 1 is deleted from the control-permitted apparatuses. Consequently, another EMS (e.g. EMS 2) can hereinafter perform an authentication process with the battery system.

On this occasion, the control unit 504 of the battery system can know from charge/discharge power information of the charge/discharge information storage unit 503 that the remaining number of control permits in the access control information is 1 so that the battery system can perform the authentication process with EMS 2 (S2201). Moreover, because contents of charge/discharge control of EMS 2 satisfy the condition of charge/discharge power information stored in the charge/discharge information storage unit 503 (S2202), EMS 2 and the battery system execute the authentication process (S2203 and S2303). At this point of time, the control unit 504 stores the access control information in the battery information storage unit 502 so that the remaining number of control permits is set at zero and EMS 2 is allocated as the control-permitted apparatus.

The generating unit 905 of EMS 2 generates an instruction message concerned with charge/discharge control and the communication unit 906 of EMS 2 transmits the generated instruction message to the battery system (S2305). The control unit 504 of the battery system performs charge/discharge control of the power supply unit 501 within an allowable range based on the instruction message received from EMS 2 (S2205). When charge/discharge control from EMS 2 is terminated, EMS 2 and the battery system execute authentication cancellation (S2206 and S2306). The control unit 504 of the battery system terminates access to EMS 2, increases the remaining number of control permits in the access control information of the battery information storage unit 502 by one and stores the access control information in the battery information storage unit 502 so that EMS 2 is deleted from the control-permitted apparatuses. Consequently, another EMS can hereinafter perform an authentication process with the battery system.

That is, as shown in the example of FIG. 21, after EMS 1 completes the authentication process with the battery system, EMS 1 recognizes access permission and starts charge/discharge control. After charge/discharge control is terminated, EMS 1 cancels authentication with the battery system to thereby return the remaining number of control permits in the access control information from 0 to 1. Similarly, EMS 2 is permitted for charge/discharge control based on authentication with the battery system.

Although this embodiment has been described in the case where the battery system permits the authentication process based on charge/discharge power information, the battery system and EMS do not execute the authentication process when the condition of charge/discharge power information is not satisfied (S2204 and S2304).

As described above, according to the fifth embodiment, the authentication process and the access determination process are performed as one and the same process so that the quantity of processing as well as safety and power throughput can be improved efficiently.

Incidentally, access termination based on a predetermined criterion in the charge/discharge instruction apparatus means determination of termination in the case where the difference between rated charge/discharge power of the battery and the quantity of electric power in charge/discharge control is larger than a predetermined threshold or in the case where the state of charge (SOC) of the battery is larger than a predetermined threshold. For example, in the scene of FIG. 1, when a power producer temporarily borrows a battery system provided on the consumer side such as a building, a home, etc., the battery system can be used in an ordinary state on the consumer side if SOC before borrowing and SOC after borrowing are equal to each other. When a charge/discharge instruction apparatus of the power producer reduces SOC of the battery from 80% to 50% by using the battery, it is desirable that termination of charge/discharge control is determined after the battery is charged to return SOC from 50% to 80% again.

FIGS. 24A to 24E show communication messages transmitted/received between a charge/discharge determination apparatus and a charge/discharge instruction apparatus in the first to fifth embodiments. FIG. 24A shows a communication message concerned with authentication. FIG. 24B shows a communication message concerned with an access request. FIG. 24C shows a communication message concerned with access permission. FIG. 24D shows a communication message concerned with access termination. FIG. 24E shows a communication message concerned with charge/discharge control. Each communication message has an identifier for identifying authentication, access request, etc. in addition to a communication header of TCP/IP (Transmission Control Protocol/Internet Protocol). Information of the quantity of permitted power, the quantity of scheduled power, etc. can be constructed based on information of the number, start time, end time and charge/discharge power. Besides a method of constructing such communication messages based on a procedure such as IEC 61850-7-420 International Standard, etc. defining a communication specification concerned with a distributed power source, a method of constructing such communication messages based on a procedure of Web service according to XML (eXtensible Markup Language) can be conceived as a method of constructing such communication messages. However, the embodiments do not depend on any specific protocol but can be assembled freely in accordance with the place to be applied.

The charge/discharge instruction apparatus and the charge/discharge determination apparatus can be implemented, for example, by means of a general-purpose computer apparatus as basic hardware. That is, the charge/discharge instruction apparatus and the charge/discharge determination apparatus can be implemented by means of a program executed by a processor mounted in a computer apparatus. On this occasion, the charge/discharge instruction apparatus and the charge/discharge determination apparatus may be implemented by means of the aforementioned program which is installed in the computer apparatus in advance or by means of the aforementioned program which is stored in a storage medium such as a CD-ROM or distributed through a network and installed suitably in the computer apparatus. Alternatively, the charge/discharge instruction apparatus and the charge/discharge determination apparatus can be implemented by means of a memory, a hard disk or a storage medium such as a CD-ROM, a CD-RW, a DVD-RAM or a DVD-ROM, etc. built in or externally attached to the computer apparatus.

The embodiments are not limited as they are, and constituent members may be modified without departing from the scope of the invention. Constituent members disclosed in the embodiments may be combined suitably. For example, some constituent members may be removed from all constituent members disclosed in the embodiments. And, constituent members disclosed in different ones of the embodiments may be combined suitably.

According to the embodiments, an effect of increasing power throughput resulting from charge/discharge is obtained because both electric power system and communication system are utilized so that communication messages concerned with access control are exchanged between a charge/discharge determination apparatus (battery system) and a charge/discharge instruction apparatus (EMS) to thereby determine charge/discharge.

The invention claimed is:

1. A charge/discharge instruction apparatus, comprising:
a charge/discharge instruction unit which sends an access request to a charge/discharge determination apparatus for performing a charge/discharge control of a battery via the charge/discharge determination apparatus, wherein the access request includes:
operation mode information as to whether a charge/discharge control to be performed on the battery is an on-demand operation or a scheduled operation, and
scheduled power information as to a scheduled power quantity to be required in the charge/discharge control in the case of the scheduled operation, and
wherein the charge/discharge determination apparatus is coupled with the charge/discharge instruction apparatus, another charge/discharge instruction apparatus and the battery receives the access request not only from the charge/discharge instruction apparatus but also from the other charge/discharge instruction apparatus;
a communication unit which transmits a communication message concerned with the access request to the charge/discharge determination apparatus, and which receives a communication message from the charge/discharge determination apparatus; and
a control unit which, when the communication message from the charge/discharge determination apparatus indicates permission to the access request, starts the charge/discharge control of the battery via the charge/discharge determination apparatus, and
which, when the communication message from the charge/discharge determination apparatus indicates rejection to the access request due to permission to the access request from the another charge/discharge instruction apparatus, waits for the communication message indicating permission which is to be sent upon completion of the charge/discharge control with the scheduled operation by the another charge/discharge instruction apparatus based on the scheduled power information, and then starts the charge/discharge control of the battery via the charge/discharge determination apparatus.

2. The charge/discharge instruction apparatus of claim 1, further comprising:
a battery information storage unit which stores battery information concerned with the battery, wherein the control unit controls the access request based on the charge/discharge information, the battery information and contents of the charge/discharge control.

3. The charge/discharge instruction apparatus of claim 1, wherein the access request further includes authentication information of the charge/discharge determination apparatus, and
wherein the control unit performs an authentication process between with the charge/discharge determination apparatus.

4. A charge/discharge instruction method, comprising the following steps:
operating a charge/discharge instruction unit to send an access request to a charge/discharge determination apparatus for performing a charge/discharge control of a battery via the charge/discharge determination apparatus, wherein the access request includes:
operation mode information as to whether a charge/discharge control to be performed on the battery is an on-demand operation or a scheduled operation, and
scheduled power information as to a scheduled power quantity to be required in the charge/discharge control in the case of the scheduled operation, and
is coupled with the charge/discharge instruction apparatus, another charge/discharge instruction apparatus and the battery receives the access request not only from the charge/discharge instruction apparatus but also from the other charge/discharge instruction apparatus;
operating a communication unit to transmit a communication message concerned with the access request to the charge/discharge determination apparatus, and which receives a communication message from the charge/discharge determination apparatus; and
operating a control unit to start the charge/discharge control of the battery via the charge/discharge determination apparatus when the communication message from the charge/discharge determination apparatus indicates permission to the access request, and
wait, when the communication message from the charge/discharge determination apparatus indicates rejection to the access request due to permission to the access request from the another charge/discharge instruction apparatus, for the communication message indicating permission which is to be sent upon completion of the charge/discharge control with the scheduled operation by the another charge/discharge instruction apparatus based on the scheduled power information, and then starts the charge/discharge control of the battery via the charge/discharge determination apparatus.

5. A charge/discharge instruction program for causing a computer to execute the steps of claim 4.

* * * * *